(12) United States Patent
TeGrotenhuis et al.

(10) Patent No.: US 7,297,324 B2
(45) Date of Patent: Nov. 20, 2007

(54) MICROCHANNEL REACTORS WITH TEMPERATURE CONTROL

(75) Inventors: Ward E. TeGrotenhuis, Kennewick, WA (US); David L. King, Richland, WA (US); Greg A. Whyatt, W. Richland, WA (US); Christopher M. Fischer, Yakima, WA (US); Robert S. Wegeng, Richland, WA (US); Kriston P. Brooks, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 396 days.

(21) Appl. No.: 10/385,831

(22) Filed: Mar. 11, 2003

(65) Prior Publication Data

US 2003/0180216 A1   Sep. 25, 2003

Related U.S. Application Data

(60) Provisional application No. 60/379,163, filed on May 9, 2002, provisional application No. 60/363,269, filed on Mar. 11, 2002.

(51) Int. Cl.
*B01J 19/00* (2006.01)
*C01B 3/12* (2006.01)

(52) U.S. Cl. ............... 423/659; 423/655; 423/656; 423/352; 423/359; 518/700; 518/712; 536/115; 560/243; 568/579; 568/895

(58) Field of Classification Search ............ 423/659, 423/655, 656, 352, 359; 518/700, 712; 536/115; 560/243; 568/579, 895
See application file for complete search history.

(56) References Cited

U.S. PATENT DOCUMENTS 4,133,650 A    1/1979    Germerdonk et al.

(Continued)

FOREIGN PATENT DOCUMENTS

DE    3926466    12/1996

(Continued)

OTHER PUBLICATIONS

Amendment filed Mar. 21, 2007 in copending U.S. Appl. No. 10/153,577.

(Continued)

*Primary Examiner*—Timothy C. Vanoy
(74) *Attorney, Agent, or Firm*—Derek Haughan; Frank Rosenberg

(57) ABSTRACT

Microchannel devices and method of use are disclosed wherein a reaction microchamber 52 is in thermal contact with a heat exchange channel 61. An equilibrium limited exothermic chemical process occurs in the reaction microchamber 52. Sufficient heat is transferred to the heat exchange channels to substantially lower the temperature in the reaction microchamber 52 down its length to substantially increase at least one performance parameter of the exothermic chemical process relative to isothermal operation. Optionally, an endothermic reaction occurs in the heat exchange channel 61 which is sustained by the exothermic chemical process occurring the exothermic reaction chamber. Both the reaction chamber 52 and the heat exchange channel 61 can be of micro dimension. Catalyst 75 can be provided in the microchamber 52 in sheet form such that reactants flow by the catalyst sheet. A microchannel reactor 100 can be formed by integrally bonding an alternating stack of thin recessed sheets wherein the recesses in the sheets define the flow paths.

48 Claims, 9 Drawing Sheets

U.S. PATENT DOCUMENTS

| | | | |
|---|---|---|---|
| 4,438,809 A | 3/1984 | Papis | |
| 4,472,533 A | 9/1984 | Moskovits | |
| 4,795,618 A | 1/1989 | Laumen | |
| 4,953,634 A | 9/1990 | Nelson et al. | |
| 5,202,303 A | 4/1993 | Retallick et al. | |
| 5,248,251 A | 9/1993 | Dalla Betta et al. | |
| 5,270,127 A | 12/1993 | Koga et al. | 429/17 |
| 5,405,586 A | 4/1995 | Koves | |
| 5,534,328 A | 7/1996 | Ashmead et al. | 428/166 |
| 5,550,300 A | 8/1996 | Taylor, Jr. et al. | |
| 5,609,834 A | 3/1997 | Hamada et al. | 422/196 |
| 5,639,401 A | 6/1997 | Jacobs et al. | 252/373 |
| 5,670,269 A | 9/1997 | Hamada et al. | 429/20 |
| 5,811,062 A | 9/1998 | Wegeng et al. | 422/129 |
| 5,836,383 A | 11/1998 | Zwittig | 165/167 |
| 5,837,393 A | 11/1998 | Okamoto | 429/20 |
| 5,853,674 A | 12/1998 | Lesieur | 422/173 |
| 5,899,679 A | 5/1999 | Euzen et al. | |
| 5,945,368 A | 8/1999 | Felthouse et al. | |
| 5,997,826 A | 12/1999 | Lodeng et al. | |
| 6,033,634 A | 3/2000 | Koga | 422/198 |
| 6,096,286 A * | 8/2000 | Autenrieth | 423/651 |
| 6,110,612 A | 8/2000 | Walsh | 429/13 |
| 6,159,434 A | 12/2000 | Gonjo et al. | 422/191 |
| 6,165,633 A | 12/2000 | Negishi | |
| 6,187,066 B1 | 2/2001 | Benz et al. | 48/127.9 |
| 6,192,596 B1 | 2/2001 | Bennett et al. | 34/76 |
| 6,200,536 B1 | 3/2001 | Tonkovich et al. | 422/177 |
| 6,220,497 B1 | 4/2001 | Benz et al. | |
| 6,241,875 B1 | 6/2001 | Gough | 208/106 |
| 6,274,101 B1 | 8/2001 | Sechrist | |
| 6,313,393 B1 | 11/2001 | Drost | |
| 6,326,326 B1 | 12/2001 | Feng et al. | 502/62 |
| 6,488,838 B1 | 12/2002 | Tonkovich et al. | 208/108 |
| 6,517,234 B1 | 2/2003 | Kopf-Sill et al. | |
| 6,540,975 B2 * | 4/2003 | Tonkovich et al. | 423/659 |
| 6,613,446 B1 | 9/2003 | Peters et al. | |
| 6,616,909 B1 * | 9/2003 | Tonkovich et al. | 423/648.1 |
| 6,630,012 B2 | 10/2003 | Wegeng et al. | |
| 6,746,515 B2 | 6/2004 | Wegeng et al. | |
| 6,946,113 B2 * | 9/2005 | Seaba et al. | 423/648.1 |
| 6,969,505 B2 | 11/2005 | Tonkovich et al. | |
| 6,969,506 B2 * | 11/2005 | Tonkovich et al. | 423/652 |
| 6,974,496 B2 | 12/2005 | Wegeng et al. | |
| 6,989,134 B2 | 1/2006 | Tonkovich et al. | |
| 7,000,427 B2 | 2/2006 | Mathias et al. | |
| 7,000,684 B2 | 2/2006 | Kenny et al. | |
| 7,084,180 B2 * | 8/2006 | Wang et al. | 518/712 |
| 2002/0031471 A1 | 3/2002 | Tonkovich et al. | |
| 2003/0068261 A1 | 4/2003 | Taheri et al. | |
| 2003/0072699 A1 * | 4/2003 | Tonkovich et al. | 422/190 |
| 2003/0180216 A1 | 9/2003 | TeGrotenhuis et al. | |
| 2003/0219903 A1 | 11/2003 | Wang et al. | |
| 2004/0076562 A1 | 4/2004 | Manzanec et al. | |
| 2004/0191137 A1 * | 9/2004 | Chellappa | 422/222 |
| 2004/0199039 A1 * | 10/2004 | Brophy et al. | 585/660 |
| 2006/0251552 A1 * | 11/2006 | Wang et al. | 422/190 |

FOREIGN PATENT DOCUMENTS

| | | |
|---|---|---|
| DE | 19539648 | 2/1998 |
| EP | 0 308 976 | 3/1989 |
| EP | 0869842 A2 | 10/1996 |
| EP | 1306639 A2 | 5/2003 |
| EP | 1198344 B1 | 6/2003 |
| EP | 1382382 A1 | 7/2003 |
| JP | 61054229 A | 3/1986 |
| WO | WO94/21372 | 9/1994 |
| WO | WO96/04516 | 2/1996 |
| WO | WO97/14497 | 4/1997 |
| WO | WO99/16542 | 4/1999 |
| WO | WO01/54807 | 8/2001 |
| WO | 02/28769 A2 | 4/2002 |
| WO | WO03011449 A1 | 2/2003 |
| WO | WO031050 A1 | 4/2003 |
| WO | WO03033985 A1 | 4/2003 |
| WO | 2005/097310 A1 | 10/2005 |

OTHER PUBLICATIONS

Office Action mailed May 31, 2006 in copending U.S. Appl. No. 10/153,577.

Office Action mailed Apr. 9, 2007 in copending U.S. Appl. No. 10/279,089.

Baratti et al., "Optimal Catalyst Distribution in Catalytic Plate Reactors," Intl. J. Chem. React. Eng., vol. 1, 1-10 (2003).

Janicke et al., "The Controlled Oxidation of Hydrogen from an Explosive Mixture of Gases Using a Microstructured Reactor/Heat Exchanger and Pt/Al2O3 Catalyst," J. Catal. 191, 282-293 (2000).

Amendment filed Jan. 5, 2007 in copending U.S. Appl. No. 10/279,089.

* cited by examiner

MICROCHANNEL REACTORS WITH TEMPERATURE CONTROL

REFERENCE TO RELATED APPLICATIONS

This application claims the benefit of U.S. Provisional Application Ser. No. 60/363,269 filed Mar. 11, 2002 and U.S. Provisional Application Ser. No. 60/379,163 filed May 9, 2002 each titled Microchannel Reactors with Temperature Control, the disclosures of which are hereby incorporated by reference.

BACKGROUND

The present invention is directed to fluid reactor systems and techniques. More particularly, but not exclusively, the present invention is directed to the fabrication and use of microchannel chemical reactors with temperature control for performing equilibrium limited reactions such as chemically reversible reactions or multiple competing reactions.

For some reactions, for example certain single reactions that are chemically irreversible or endothermic, maximizing the reaction temperature is often desired because both kinetics and conversion increase with increasing temperature. However, for many reactions, trade-offs exist between kinetics, equilibrium, and reaction selectivities. For example, reversible exothermic chemical reactions generally exhibit improved reaction kinetics but lower equilibrium conversion with increasing temperature. Lowering the reaction temperature favors higher conversion but typically requires more catalyst and a larger reactor. Accordingly, more efficient utilization of catalyst and reactor resources for a desired conversion likely requires a non-uniform temperature trajectory for the reactants as they progress through the reaction process. For example, it has been found that for a single reversible exothermic reaction, such as the water-gas-shift (WGS) reaction, a theoretical optimal temperature trajectory would start at a high temperature to take advantage of fast kinetics and proceed in monotonically decreasing fashion to lower temperatures to improve conversion. More complex optimal temperature trajectories are possible with reaction sequences or competing reactions.

There are also reasons related to energy efficiency and exergetic efficiency to control the temperature trajectory of chemical reactions. For both endothermic and exothermic chemical reactions, greater thermodynamic reversibility, and therefore greater system efficiency can theoretically be achieved with reaction temperature control.

One conventional method for controlling the temperature trajectory for exothermic reactants as they flow through a reactor system is to employ a sequence of separate adiabatic reactors and heat exchangers [Levenspiel, O., *Chemical Reaction Engineering*, $2^{nd}$ Ed., John Wiley & Sons, Inc, New York, 1972, pp.509-516]. In this approach, the outlet stream from one adiabatic reactor is cooled in a heat exchanger prior to being fed to the next successive reactor. However, within each reactor, the temperature increases down the length due to the heat of reaction. Consequently, a plot of the temperature through the series of reactors is saw-toothed rather than monotonically decreasing.

A sequence of two water-gas-shift reactors with an intervening heat exchanger is the typical approach for fuel processors being developed to produce $H_2$ from liquid fuels for fuel cell power applications. [Petterson, L. J. and R. Westerholm, Int. J. Hydrogen Energy, 26, (2001), 243]. In this application, the outlet from a fuel reformer is fed to a pair of shift reactors in series. The reformate is first reacted at about 400° C. in a high temperature shift (HTS) reactor, with the outlet stream of the HTS reactor cooled to around 250° C. prior to introduction in a second shift reactor. Overall conversion of the CO to $CO_2$ is typically about 90%.

Macroscale packed-bed reactors have also been employed to improve the temperature trajectory for reversible exothermic reactions. One example is the Tennessee Valley Authority (TVA) ammonia synthesis reactor, which was simulated by Baddour et al. [Baddour, R. F., P. L. Brian, B. A. Logeais, and J. P. Eymery, Chem. Eng. Sci., 20, (1965), 281]. The TVA ammonia synthesis reactor consists of an array of 5 cm outer-diameter tubes penetrating through a packed catalyst bed. However, in this reactor temperature differences between the hot and cold stream at a given cross-section are on the order of 200° C., implying large thermal gradients across the bed and/or high heat transfer resistance.

Accordingly there exists a need for improvements in the art of reactor design to provide reactors with improved temperature control and that enable better and more precise control of reaction temperatures.

SUMMARY

One embodiment of the present invention includes a unique microchannel fluid processing system for performing chemical reactions with temperature control.

Another embodiment of the invention is a unique method for performing reversible endothermic, exothermic reactions, and/or competing reactions. The method comprises flowing reactants through a reaction channel in thermal contact with a heat exchange channel, and conducting heat in support of the reaction between the reactants and fluid flowing through the heat exchange channel to substantially raise or lower the temperature of the reactants as they travel through the reaction channel. The heat exchange channel may also be a reaction channel for another chemical reaction.

One object of the present invention is to provide improved conversion and/or selectivity in chemical reactions.

Another object is to provide chemical reactor systems that are compact.

Another object is to provide thermally efficient chemical reactor systems.

Another object is to provide thermodynamically efficient and/or exergetically efficient reactor systems.

Another object is to provide chemical reactor systems requiring reduced catalyst loads.

Another object is to provide chemical reactor systems with reduced temperature gradients across the catalyst.

Another object is to provide chemical reactor systems with high heat transfer power densities.

Another object of the present invention is to provide effective heat exchange in an exothermic reactor to remove heat of reaction and reduce the reaction temperature.

Another object of the present invention is to provide effective heat exchange in an endothermic reactor to add heat of reaction and to increase reaction temperature.

Another object of the present invention is to manage the temperature profile in a reversible exothermic reactor system to have a high initial temperature with rapid kinetics promoting an initial rapid approach to equilibrium and cooling of the reaction as it proceeds to increase conversion.

Another object of the present invention is to provide a unique method, system, device, or apparatus for processing fluids in microchannel devices.

Another object of the present invention is to provide fluid reaction systems where the length scale for heat transfer is on the order of 1 cm and preferably on the order of 1.0 mm and more preferably on the order of 0.1 mm.

Further embodiments, forms, features, aspects, benefits, objects, and advantages shall become apparent from the detailed description and figures provided herewith.

DESCRIPTION OF EMBODIMENTS

Figure 1:
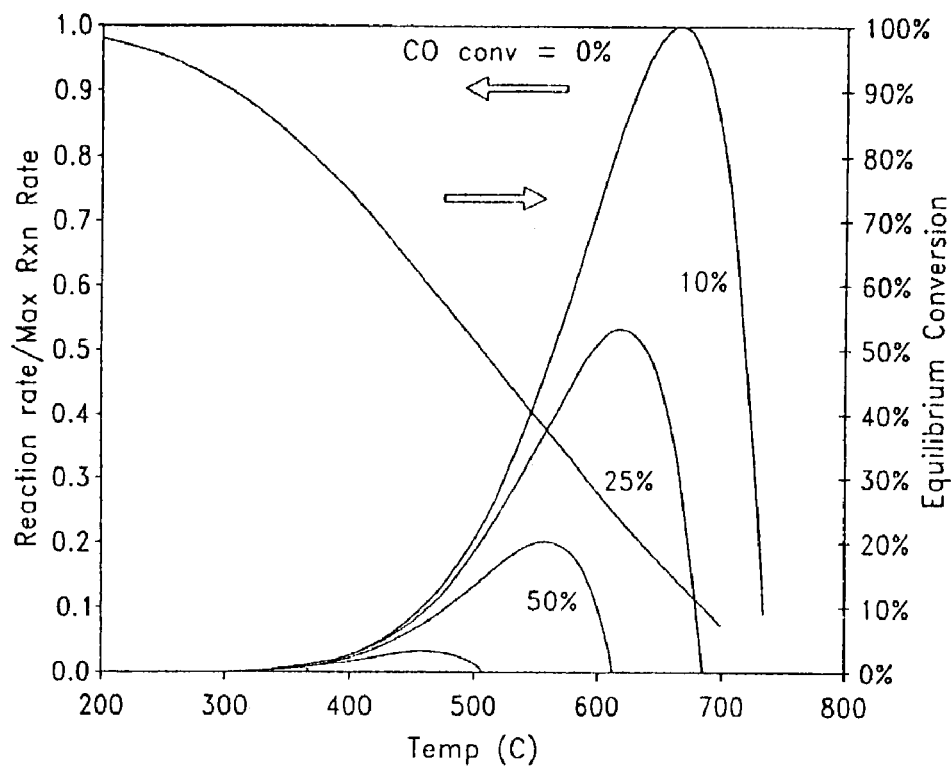
FIG. 1 is a plot of representative reaction rate curves at various CO conversions starting from a steam reformate feed at an initial composition of 9% CO, 9% $CO_2$, 36% $H_2O$, and 45% $H_2$, along with the equilibrium curve for this starting composition.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein the following definitions will apply:

"Catalyst" is a solid material that enhances reaction rate.

"Catalyst material" is a solid material that is either a catalyst or otherwise chemically interacts with a fluid, such as an adsorption medium.

"Chamber" refers to the area in which a reaction or adsorption process takes place. In the present invention, in embodiments where a catalyst is in the chamber, the area of a chamber includes the catalyst (including pores), the area above, below and to the sides of the catalyst, but not the areas to the intake or exhaust sides of the catalyst. The area above, below and to the sides of the catalyst are referred to as the reactant flow channel.

"Channels" refers to the generally accepted meaning and includes conduits and other means for directing the flow of a fluid. Channels of the invention include at least one opening, typically with an inlet and outlet, and may include other openings. As will be seen in the description below of various embodiments, numerous functions other than simple mass transport can occur within channels.

"Chemical process that utilizes fluid reactants and catalyst material" refers to catalyzed reactions or other chemical interactions between fluid streams and a solid medium, such as an adsorption medium.

"Equilibrium limited chemical process" refers to a chemical process wherein at least one measure of the equilibrium extent of the chemical process (i.e. conversion, selectivity, separation) exhibits substantial temperature dependence over the range of interest. Reversible reactions and most adsorption processes are typically equilibrium limited chemical processes as are reactions where there are competing or side reactions such that the overall selectivity of a particular product is temperature dependent.

"Fluid communication" between two areas means that a fluid can flow from one area to the other.

"Thermal communication" between two areas means that heat can flow from one area to the other.

"Heat exchanger" is a device or component designed such that heat can be transferred from one fluid to another fluid typically in an adjacent flow path.

"Volume" of a reaction chamber, unless otherwise indicated, refers to the internal volume where reaction substantially occurs but not adjacent material. Thus, referring to FIG. 9, the volume of chamber 52 is measured to the right of dotted line 76 which marks the end of the catalyst 75. Where a catalyst is present, the volume includes at least the catalyst volume and catalyst void fraction. Core volume of a heat exchanger refers to the volume of the adjacent flow paths of the two fluids during the portion that they are adjacent and subject to primary heat transfer and including the volume of any intervening material, such as walls between the adjacent flow paths. Thus, referring to FIG. 9, the core volume for the heat exchanger is the volume of chamber 52 and that portion of channel 61 and walls 70 and 72 to the right of dotted line 76.

Channels having a dimension between 1 mm and 1 cm are sometimes referred to in the art as mesochannels, with the term microchannels used for those less than 1 mm. However, for the purposes of the present application, a microchannel or a microchamber has at least one dimension (typically the depth) less than about 1 cm, often less than about 1 mm, and still more often less than about 0.5 mm. The width of a microchannel may be any magnitude, but typically will be constrained by the desire to control manufacturing processes or by the desire to control fluid distribution in a reactor or heat exchanger that has multiple microchannels. Length is unlimited, but as a practical matter for the overall purpose of miniaturization, the length is typically on the order of centimeters to tens of centimeters. Where the depth is the micro dimension, microchannels according to the present invention will typically, though not essentially, have a large ratio of length to width, for example greater than about 5.

Figure 9:
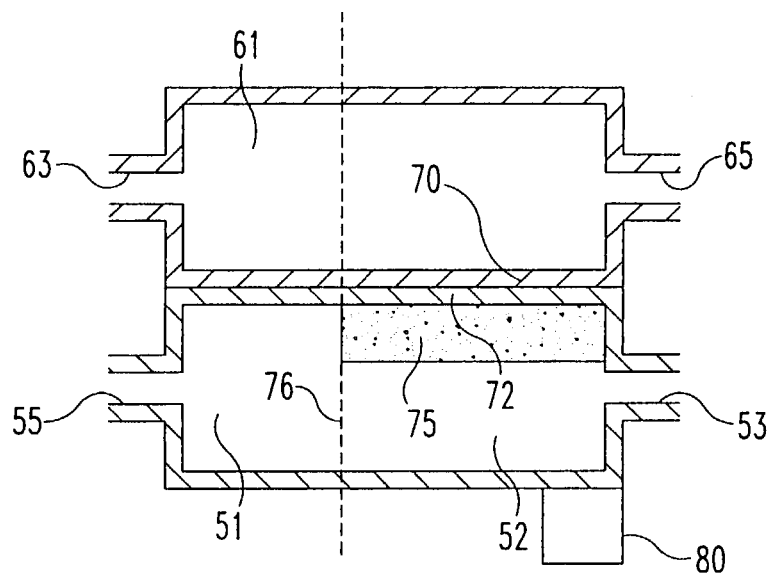
FIG. 9 is a schematic view of a microchannel reactor according to another embodiment of the invention.

Turning first to FIG. 9, in one form, the present invention is a microchannel chemical reactor having a reaction flow path 51 in thermal contact with a heat exchange channel 61. The heat exchange channel 61 may also be a reaction channel. Either the reaction flow path 51 or the heat transfer channel 61, or both, include microchannels where the smallest dimension of the microchannel is generally parallel to the direction of heat flux, which in the schematic illustration of FIG. 9 would be in a vertical direction. Reactants flow through the reaction flow path 61 from an inlet 53 to an outlet 55. Between the inlet 53 and outlet 55 is a reaction chamber 52 defined by the presence of a reaction catalyst 75 in the flow path 51, which can span some or substantially all of the length of the flow path 61. Heat exchange fluid flows through the heat exchange channel 61 from a fluid inlet 63 to a fluid outlet 65. Typically, though not essentially, at least one solid wall 70 separates the heat exchange channel 61 from the reaction chamber 52 to prevent mass transport between the fluids. In the schematic illustration of FIG. 9, two walls 70 and 72 separate the flow paths.

An optional heater 80 is also provided adjacent the inlet end of the reaction chamber 52. For the reasons described more fully below, the heater 80 at one end of the device can be used to help maintain a temperature gradient down the length of the reaction chamber 52. A cooler could be used at the other end of the reaction chamber 52 in place of or in addition to the heater 80.

When the reaction in the reaction chamber is a reversible exothermic reaction, heat is generated in the reaction chamber and transferred to the heat exchange fluid to cool the reactants as they proceed through the reaction chamber. Conversely, when the reaction in the reaction chamber is a reversible endothermic reaction, heat is transferred from a heating fluid in the heat exchange channel to the reacting fluid as the reactants proceed through the reaction chamber. When the heat transfer channel is also a reaction channel, heat is transferred from one reaction channel to the other, as the reactants proceed through their respective flow paths.

A microchannel reactor according to the present invention is preferably designed to achieve a temperature trajectory down the length of the reaction chamber that approaches a predetermined temperature trajectory. Typically, this predetermined temperature trajectory is substantially different from the temperature trajectory that would occur if the reaction were allowed to proceed adiabatically or isothermally. In preferred forms, this predetermined temperature trajectory approaches a theoretically determined optimal temperature trajectory based on the reaction rate and design parameters specific to the particular application.

Theoretically Optimum Temperature Trajectories

The reaction rate for a single reaction with a given catalyst is a function of the composition and the temperature. The temperature corresponding to the maximum reaction rate, $T_{max}$, at a given composition is determined by setting the partial derivative of the reaction rate with respect to temperature equal to zero. When expressed in terms of conversion of reactant A, $T_{max}$, is defined by $$\frac{\partial r_A(x_A, T_{max}(x_A); C_{i0})}{\partial T} = 0 \qquad (1)$$

at a given conversion, $x_A$, starting from an initial composition, $C_{i0}$.

Assuming an ideal plug flow reactor, a theoretical optimum temperature trajectory is determined from the mass balance equation, $$C_{A0} u_s \frac{dx_A}{dz} = r_A(x_A, T_{max}(x_A)), \qquad (2)$$

where $C_{A0}$ is the initial concentration of A and $u_s$ is the flow velocity, by plotting $T_{max}$ as a function of reactor length. Integrating this equation gives the minimum reactor length required to achieve a given level of conversion. The appropriate catalyst loading is also calculated from the reaction rate equation.

An exemplary reaction useful in the present invention is the water-gas-shift (WGS) reaction. The WGS reaction is employed in fuel processors that reform liquid fuels to produce hydrogen for fuel cells. The shift reaction increases hydrogen yield while reducing CO, which is a poison for the proton-exchange membrane (PEM) fuel cell anode [Amplett, J. C., R. F. Mann, and B. A. Peppley, Hydrogen Energy Progress X, Proc. of the World Hydrogen Energy Conference, 3, (1994), 1681]. The WGS reaction, $$CO + H_2O \rightleftharpoons H_2 + CO_2, \qquad (3)$$

is exothermic and reversible. Assuming the catalyst is first order in $H_2O$ only and simplifying the rate expression by neglecting Langmuir adsorption terms, the rate equation becomes $$r_{CO} = \rho_B k_{CO}(T) \left( p_{H_2O} - \frac{p_{H_2} p_{CO_2}}{K_{eq}(T) p_{CO}} \right). \qquad (4)$$

Where $\rho_B$ is the catalyst loading in g-cat/cm$^3$, $k_{CO}$ is the reaction rate coefficient in mol CO/s.g-cat.atm, and $p_i$ is the partial pressure of component i. The equilibrium constant dependence on temperature is [CHEMCAD, Version 5.1, Chemstations, Inc., Houston, Tex., USA, 2001]

$$K_{eq}(T) = \frac{p_{H_2O} \, p_{CO}}{p_{H_2} p_{CO_2}} = \exp(-4.354 + 4594/T[K]). \qquad (5)$$

The kinetic coefficient, $k_{CO}$, is also expressed as an Arrhenius relationship.

The plots in FIG. 1 illustrate the dependence of reaction rate on temperature for the WGS reaction based on a kinetic model derived from experimental data taken between 225° C. and 400° C. The initial composition is representative of a reformate stream generated from steam reforming of isooctane at a 3:1 steam to carbon ratio and contains 9% CO, 9% $CO_2$, 36% $H_2O$ and 45% $H_2$. While a reforming outlet typically has at least these four compounds CO, $CO_2$, $H_2O$ and $H_2$, it is to be understood that the ratios of the components depends on the type of reforming being performed, such as autothermal, partial oxidation, or steam reforming as well as the operating conditions of the reformer. In addition, additional material may be added to the reformate outlet prior to performing a water gas shift reaction, such as the additional water, as is know in the art. Accordingly, the inlet stream to a water gas shift reactor according to the present invention might have a CO to $CO_2$ molar ratio that ranges from about 2:1 to about 1:5. Typically, the steam to gas ratio, defined as the moles of water divided by the moles of the remaining gas, is between about 0.2 and 0.6, for example between 0.3-0.5.

The initial maximum reaction rate occurs at about 665° C., which is only 70° C. colder than the equilibrium temperature of the initial composition. As the reaction proceeds (i.e. increasing CO conversion), the peak reaction rate rapidly drops. The peak rate drops by half after 10% conversion, by almost a factor of 30 at 50% conversion, and by over three orders of magnitude by the time 90% conversion is reached. The temperature at which the peak rate occurs also drops with increasing CO conversion. The reaction rate curves indicate that the size of a reactor to accomplish high conversion and the amount of catalyst required is dependent on the temperature trajectory through the reactor.

Figure 2:
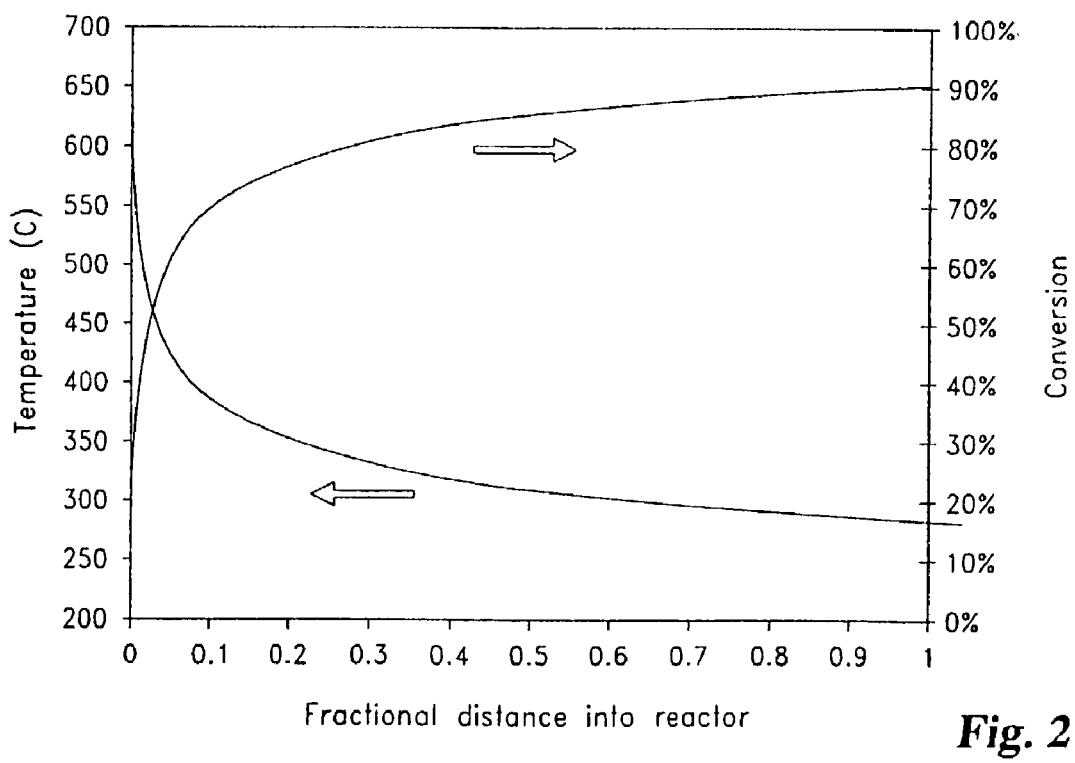
FIG. 2 is a representative theoretically optimum temperature profile and corresponding conversion profile for a water-gas-shift reactor with a steam reformate feed at an initial composition of 9% CO, 9% $CO_2$, 36% $H_2O$, and 45% $H_2$.

FIG. 2 illustrates a representative theoretically optimal temperature profile (plot of $T_{max}$ versus distance into the reactor) based on the same kinetic relationship and initial composition as used in FIG. 1. For a reactor operating with this temperature trajectory, most of the conversion (about 82%) would occur in the first third of the reactor, and the remaining two-thirds of the reactor would be required for the remaining 8% of conversion, a direct result of much lower activity as the temperature decreases. Furthermore, the temperature profile of FIG. 2 calls for an initial rapid decrease in temperature—from 665° C. at the inlet to 400° C. at eight percent along the axial length of the reactor. As seen by the plot of conversion, this first eight percent of the reactor length is also where two-thirds of the heat of reaction would be generated, further adding to the heat load imbalance towards the inlet end of the reactor.

For a variety of reasons, however, it may not be practical or desirable to follow a theoretically optimal temperature profile during the entire length of the reactor. For example, concerns over methane formation, coking, or catalyst sintering may place constraints on the inlet temperature to the reactor or the maximum temperature in the reactor. Likewise, cost constraints can become manifest if following the ideal temperature trajectory would require that the reactor system be manufactured in more expensive materials than would otherwise be practical. An alternative temperature trajectory according to the present invention is to enter the reactor at a temperature near an upper limit temperature and operate substantially isothermally through the initial stage of the reactor. Once the reaction has proceeded to a point where the optimum temperature ($T_{max}$) drops below an upper constraint, then the theoretically optimal temperature profile shown in FIG. 2 can be followed. Integrating Equation 3 for this alternate temperature trajectory gives an increase in reactor size of only 12% for a 90% conversion reactor when starting with the example steam reformate stream at 350° C. A further alternative would be to operate substantially adiabatically through the initial stage.

Advantages can be realized by using one or more reactors with controlled temperature trajectories as compared to two adiabatic reactors with intercooling, which is the typical approach used in fuel reforming. In the case of adiabatic reactors with intercooling, reactor productivity is maximized for a given total conversion by optimizing the two inlet temperatures and the amount of conversion in the first reactor. When comparing this three component configuration to the optimal temperature trajectory for the steam reformate stream and using the same kinetic rate expression, approximately 2.3 times more catalyst is required for 90% conversion in the optimized two-stage adiabatic reactor system than is required if the optimized temperature trajectory in FIG. 2 is achieved. When the conversion is increased to 93%, the factor increases to 2.5 times more catalyst. Of course, the actual size of a single reactor operating with the temperature trajectory of FIG. 2 would likely be larger than any single component of the three component system. However, if the entire system of two reactors plus the intervening heat exchanger is considered, the over all size and mass will likely be smaller with the optimal temperature profile. The optimal temperature system is also simplified by combining three components into one. In addition, the catalyst may be an important cost element, so improving catalyst productivity may be sufficient alone for pursuing an optimized profile.

Temperature Trajectories in a WGS Microchannel Reactor

Figure 3:
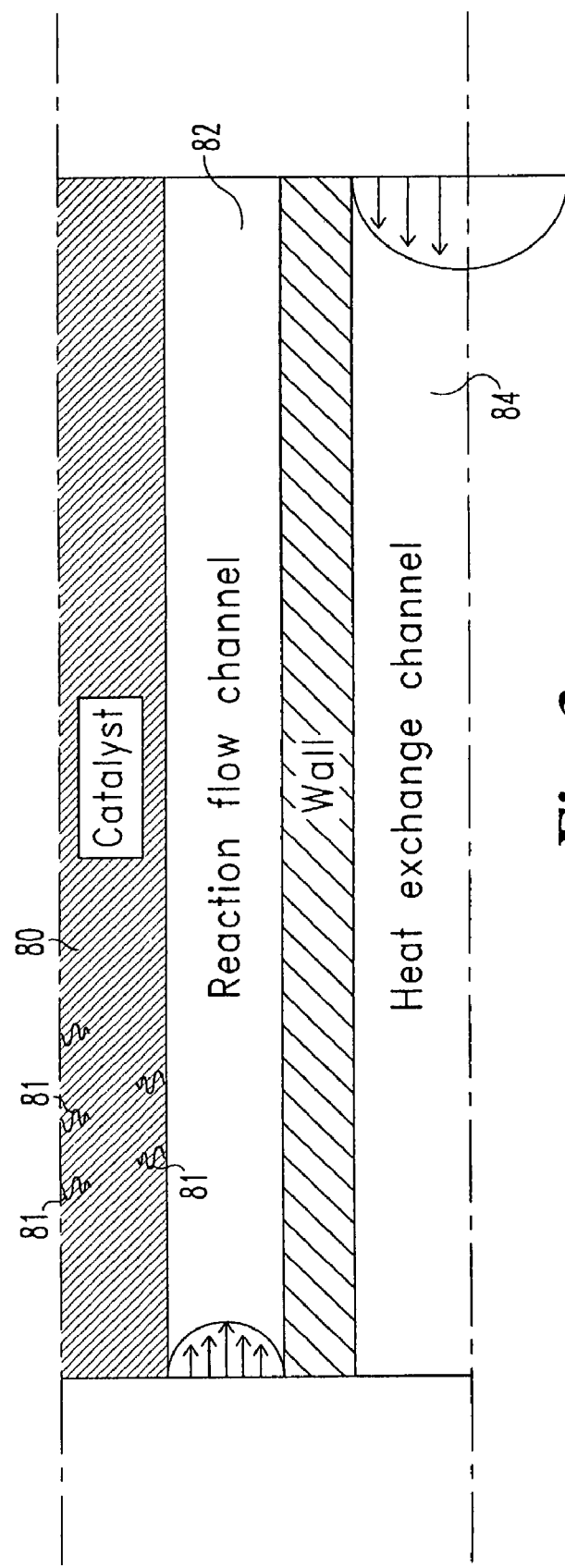
FIG. 3 is a two-dimensional schematic of the repeat unit for a microchannel reactor with counter-current heat exchange where dashed lines indicate symmetry planes.

Microchannel reactors according to the present invention offer the advantage of exceptional heat exchange integration and can be utilized for approaching optimal temperature trajectories for exothermic, reversible reactions. A schematic of one inventive microchannel reactor configuration is shown in FIG. 3. Catalytic monoliths are located at the center of each of an array of reaction flow channels such that reactants flow by both sides of the catalyst structures. Reactants from the reaction flow channel diffuse into pores in the catalyst structure to react, generating heat. Reaction products then diffuse out of the catalyst structure and into the bulk reactant flow path. Diffusion into and out of the catalyst is in a direction generally transverse to the bulk flow direction.

The reaction flow channel arrays are interleaved with heat exchange channels, and a heat exchange fluid flowing co-current or counter-current (as shown in FIG. 3) to the reaction flow removes the heat of reaction and cools the gas, thereby establishing a desired temperature trajectory for the reaction. The choice of coolant, the temperature and flow of the coolant, and the geometry and relative orientation of the flow channels are among the design variables that can be modified as would occur to those of skill in the art for achieving a desired temperature profile for a given reaction and catalyst. In a preferred form, design variables are selected to substantially maximize catalyst productivity.

As depicted in FIG. 3, the half width of the catalyst, the full width of the reaction chamber, the wall thickness, and the half width of the heat exchange channel each provide a heat transfer length. Preferably, one or more of these heat transfer lengths is less than about 1 cm, more preferably less than about 1 mm, still more preferably less than about 0.5 mm, most preferably less than about 0.25 mm. Even more preferably, three or more of the heat transfer lengths are within those ranges.

The high effectiveness of heat exchange possible in the microchannel reactors according to the present invention allows for relatively small approach temperatures. Approach temperature is defined as the smallest difference in average temperature between the flowing reactant stream and the heat exchange fluid on opposite sides of the heat exchange wall at a given cross section. One measure of the approach temperature is the temperature differential between the cooling fluid inlet and the product outlet during counter-current flow. Small approach temperatures in turn help maintain reduced thermal gradients across a cross section of the reactor. At the maximum conversion, the reformate exits at 174° C., a 49° C. approach temperature at the cold end. In addition, the coolant exits at 398° C., which is hotter than the incoming reformate stream, indicating a temperature crossover between the reactant fluid and the heat exchange fluid (meaning the cooling fluid becomes hotter than the reactant fluid). This ability to capture the heat of reaction at a higher temperature creates the potential to realize a high degree of exergetic efficiency and therefore to obtain high overall system efficiency, for example when a microchannel reactor according to the present invention is thermally integrated in a fluid processing system. One example is the production of methanol from syngas (mixtures of CO and $H_2$), where the recovery of heat of reaction at higher temperatures, such as to make steam, provides an economical advantage through energy efficiency. It is contemplated that, in operation, inventive microchannel reactors according to the present invention will have approach temperatures less than about 200° C., more preferably less than about 150° C., still more preferably less than about 100° C., and most preferably between about 75° C. and 25° C. Approach temperatures between 0 and 20° C. are also contemplated. It is to be understood that the approach temperatures above and any other temperature difference described herein refer to steady state or substantially steady state operation of the system and exclude temperature differences that may occur at start up or shut down.

In further preferred forms, reaction systems according to the present invention are designed so that they approximately follow the ideal temperature trajectory with little temperature difference between the reacting fluid and the heat exchange fluid (i.e. less than 100° C., more preferably less than 75° C., and most preferably less than about 50° C.), for a substantial portion of the length of the reactor system. In this form, a high degree of thermodynamic reversibility can be obtained. This is also referred to in some texts as a circumstance where high exergetic efficiency can be realized. (Adrian Bejan, George Tsatsaronis, and Michael Moran, "Thermal Design and Optimization," John Wiley & Sons, Inc., New York, 1996) In general, a higher degree of energy efficiency can be obtained when a high degree of exergetic efficiency is obtained.

In fact, the heat exchange in the example shown in FIG. 4 (and describe more fully at Example 2 below) could be considered too effective as indicated by an outlet reformate temperature of 174° C., which is well below the optimum reaction rate temperature. In this case, CO conversion would benefit by reducing the heat transfer coefficient or by increasing the temperature of the coolant. The latter effect is demonstrated in FIG. 5 (see Example 3 below). Again the reformate flow rate and inlet temperature are constant and the amount of coolant flow rate is increased for three different coolant temperatures. In this case, the maximum conversion increases by 2.7% when the heat exchange fluid temperature is increased from 125° C. to 225° C.

Figure 6:
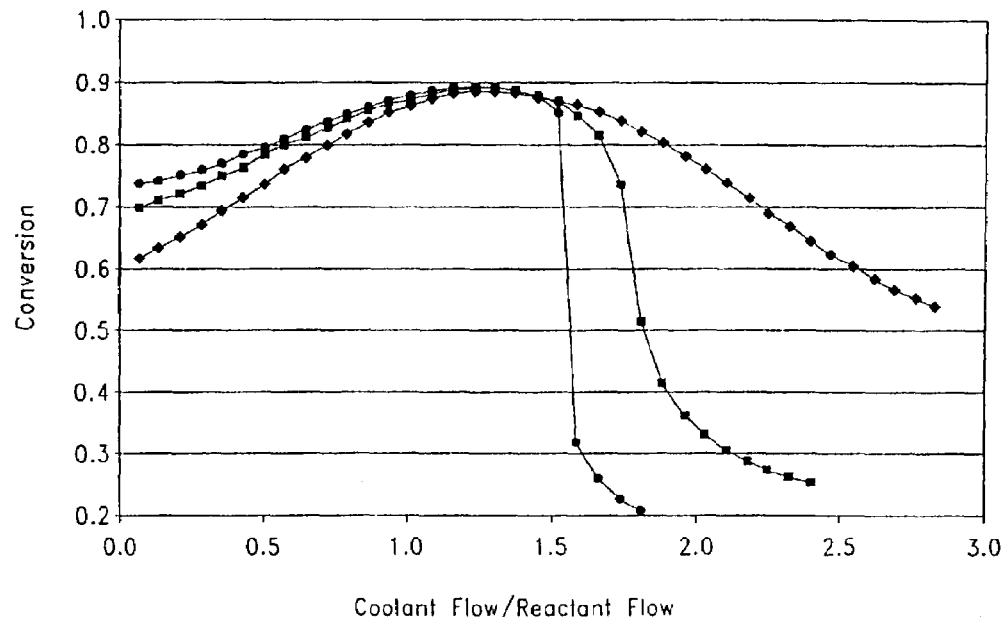
FIG. 6 is a plot of the representative effect of reactant inlet temperature on CO conversion for a water-gas-shift microchannel reactor according to FIG. 3 having a constant steam reformate feed flow and an initial composition of 9% CO, 9% $CO_2$, 36% $H_2O$, and 45% $H_2$ and being cooled with 225° C. air; results shown for coolant inlet temperature of 400° C. (♦), 350° C. (■), and 325° C. (●).

Lowering the reactant flow rate will increase CO conversion but decrease reactor productivity. The other variable to consider is the inlet temperature of the reactant flow. Increasing the starting temperature will increase initial reactivity but also increase the heat exchange duty. FIG. 6 illustrates the effect of reactant feed temperature at a constant reactant feed flow rate and a coolant temperature of 225° C. There is a negligible effect on the maximum conversion that can be achieved, but the potential for quenching the reaction is much stronger at the lower feed temperature.

It is contemplated that microchannel reactors according to the present invention can be operated with an overall heat transfer duty, from the reaction chamber to the heat exchange channel, such that the core of the system sees a heat transfer power density greater than about 0.1 Watt/cm$^3$, more preferably greater than about 0.5 Watt/cm$^3$, still more preferably greater than about 1.0 or 1.5 Watt/cm$^3$, and most preferably more than about 2.0 Watt/cm$^3$. As used herein, the core reactor volume, the volume basis for the power densities cited above, is the sum of 1) the catalyst volume and the volume of the flow channels immediately adjacent to the catalyst (i.e. the reaction chamber), 2) the volume of the heat exchanger flow channels immediately adjacent to the reaction chamber, and 4) the volume of the walls separating the reaction chamber and the adjacent heat exchange channels. The core reactor volume does not include the containing walls, header regions, or other parts of the device not directly a part of the primary heat transfer flow path.

Sabatier Process and Reverse-Water-Gas-Shift (RWGS) Reaction

Another reversible, exothermic reaction is the Sabatier Process reaction of hydrogen and carbon dioxide. This reaction is of interest for producing propellant on the surface of Mars from the atmospheric carbon dioxide [B. M. Frankie and R. Zubrin, "Chemical Engineering in Extraterrestrial Environments", Chem. Eng. Prog., 95(2), 45-54 (1999)]. Having to transport only hydrogen or water from earth instead of all the propellant for the return trip has the potential for substantial savings in launch mass for both sample return and manned missions to Mars [S. J. Hoffman and D. L. Kaplan, Eds., *Human Exploration of Mars: The Reference Mission of the NASA Mars Exploration Study Team*, NASA SP-6107, July 1997].

The Sabatier Process reaction, $$CO_2 + 4H_2 \rightleftharpoons 2H_2O + CH_4, \tag{6}$$

is an exothermic reaction with a 165 kJ/mol $CO_2$ heat of reaction at 25° C. Carbon monoxide is a byproduct formed by the reverse-water-gas shift reaction. Both the conversion and possibly selectivity can be enhanced by operating a microreactor with an optimal temperature trajectory.

Figure 7:
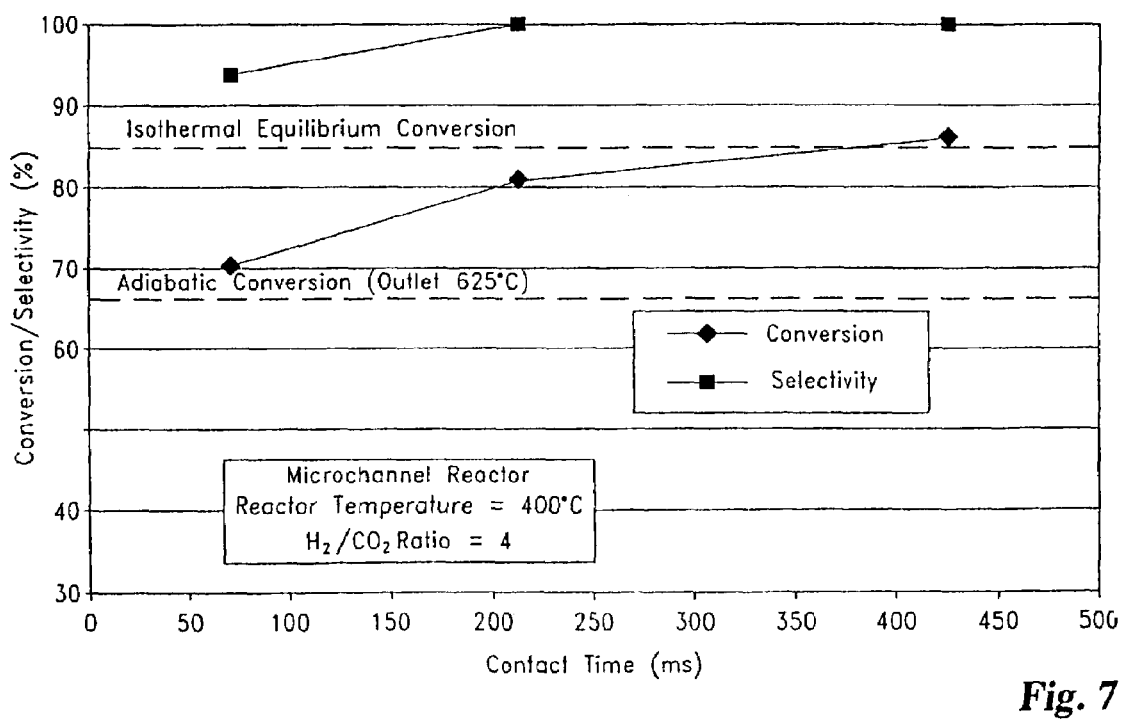
FIG. 7 is a plot of conversion and selectivity results from a Sabatier reaction with a $N_2$-cooled, counter-current microreactor compared to equilibrium results at isothermal and adiabatic conditions.

The principle is illustrated with data from a $N_2$-cooled, counter-current microchannel reactor. A mixture of 20% $CO_2$ and 80% $H_2$ is fed to a microreactor at 400° C. If allowed to proceed adiabatically to equilibrium the temperature would rise to 625° C., limiting the conversion to 66% of $CO_2$ and selectivity for methane over carbon monoxide would drop to 41.6%. Alternatively, isothermal operation would allow the conversion to increase to as high as 85% with methane selectivity 99.4%. Data shown in FIG. 7 illustrate how adiabatic conversion is exceeded with active cooling in a microreactor. At the highest contact time, calculated as the reactor volume divided by the standard state feed flow rate, the isothermal conversion is exceeded slightly. Proceeding to longer contact times with additional cooling would generate a temperature profile giving even higher conversions.

Still another reaction of interest is the Reverse-Water-Gas Shift (RWGS) reaction, the opposite of the Water-Gas-Shift reaction. Again, one interest is to use this reaction, in parallel with the Sabatier Process reaction, to support the production of propellants on Mars. In this case, the RWGS reaction is an endothermic reaction, with high conversion favored at high temperatures.

In one form of the invention, both an endothermic and an exothermic reaction are combined in a single reactor system with one reaction occurring in the reaction chamber and the other reaction occurring in the heat exchange channel. One example is the combination of the Sabatier Process reaction and the RWGS reaction. As described above, the Sabatier Process reaction is an exothermic reaction with high conversion favored at low temperatures, but where faster kinetics would be realized in a microchannel reactor that is operated with a high inlet temperature and a low outlet temperature, in accordance with the present invention. By contrast, the RWGS reactor is an endothermic reaction that is ideally operated in approximately the opposite mode. Combining the two in a single reactor allows one or both of the reactions to be performed with a greater degree of thermodynamic reversibility, and therefore a higher degree of exergetic efficiency. The combination also allows at least a portion of the heat of reaction from the exothermic Sabatier Process reaction to be used as at least a portion of the heat of reaction for the RWGS reaction. By contrast, if these two reactions were operated solely in separate adiabatic reactors, then it would not be possible to use the heat of reaction from one to support the heat of reaction from the other.

It is to be understood that in designing a microchannel reactor according to the present invention, one of skill in the art would consider not only the specific reaction and catalysis, but on system considerations, such as thermal integration, start-up, turn-down, and dynamic response in selecting the optimal design parameters.

Figure 10:
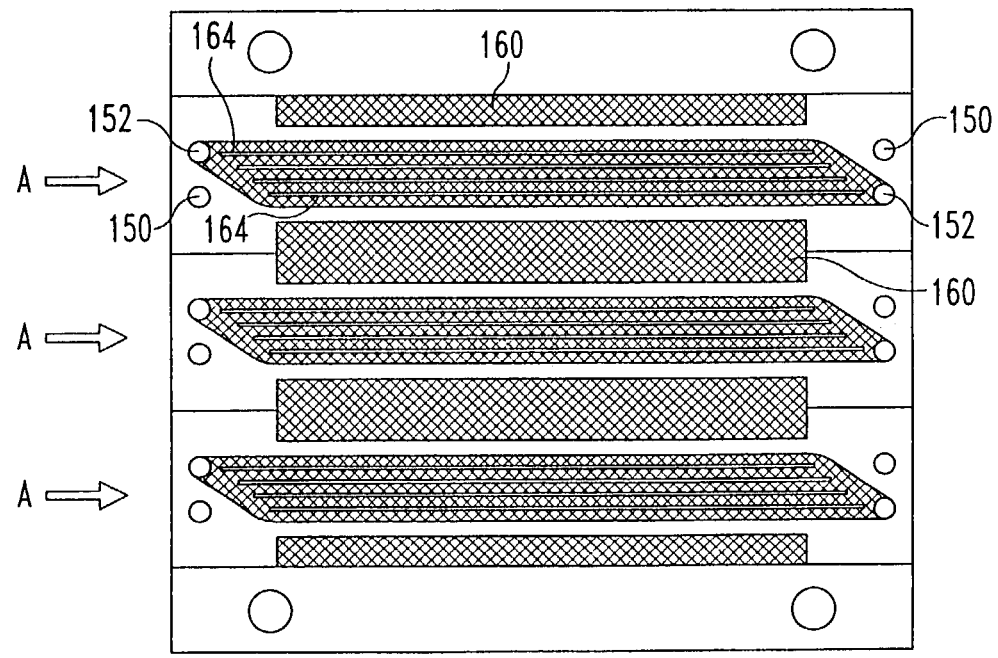
FIG. 10 is shim A for constructing the microchannel reactor of FIG. 8.
Figure 11:
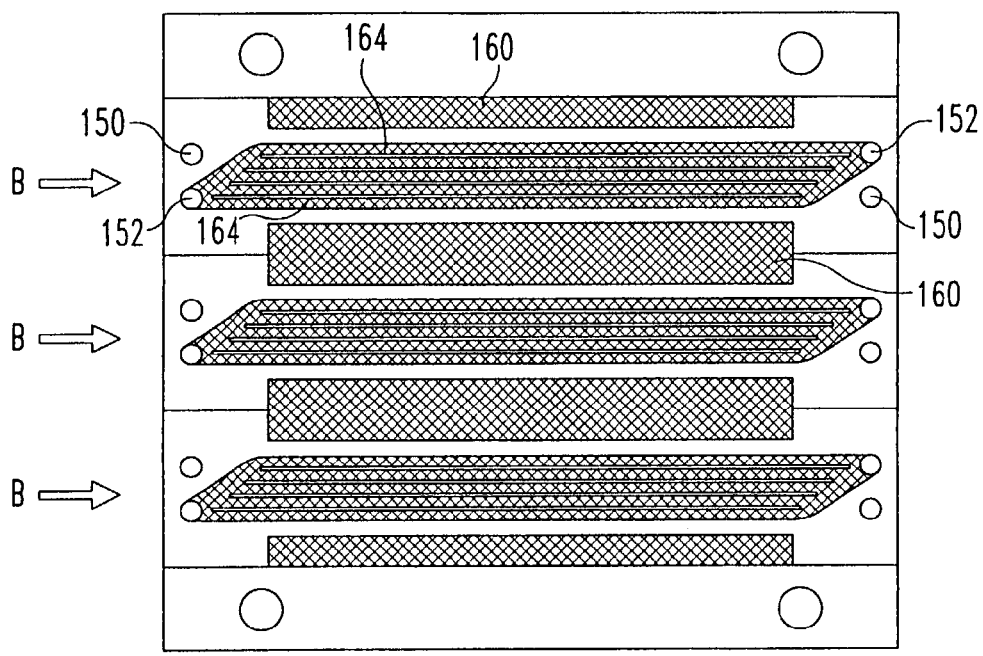
FIG. 11 is shim B for construction the microchannel reactor of FIG. 8.
Figure 12:
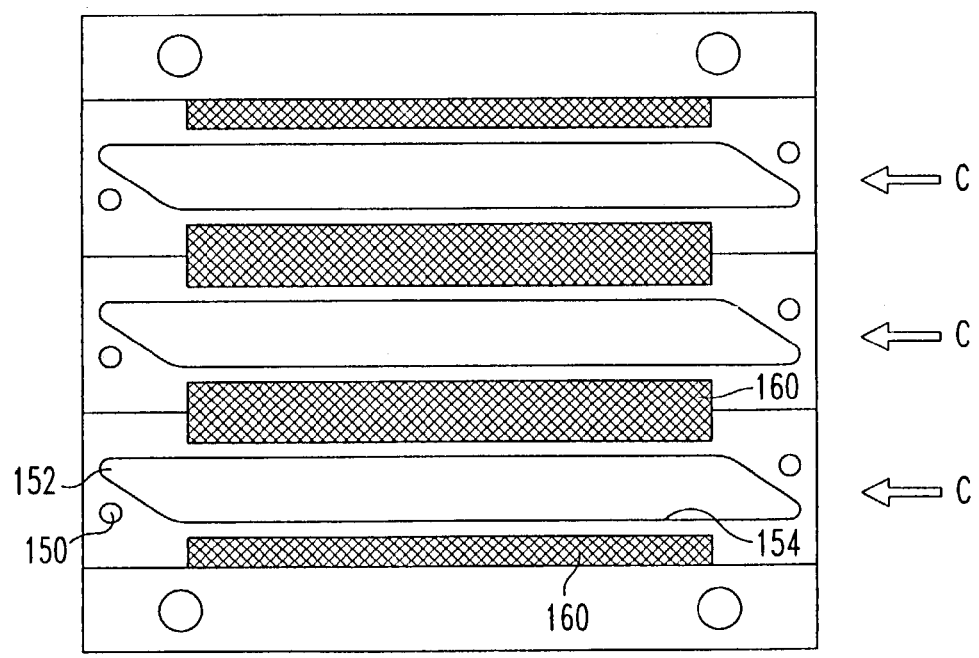
FIG. 12 is shim C for construction the microchannel reactor of FIG. 8.

Turning now to FIGS. 8 and 10-12, a microchannel reactor 100 according to the present invention includes a reactant inlet 110, a reactant outlet 120, a heat exchange fluid inlet 130, and a heat exchange fluid outlet 140. Reactor 100 is constructed by alternately stacking a series of thin sheets or shims (designated A, B, C, FIGS. 10, 11, and 12 respectively) containing channel features to provide stacked arrays of microchannel flow paths in reactor 100. It is to be understood that, as shown in FIGS. 10-12, each shim sheet contains three identical shim patterns so that three reactors 100 can be constructed simultaneously.

Each of the individual shim patterns A, B, C for a single reactor include two through holes 150, 152 at each end. In use, these through holes align with the fluid inlets and outlets (110, 120, 130, 140) to provide fluid headers providing fluid distribution throughout the reactor 100. Shim patterns A and B (FIGS. 10 and 11 respectively) are each etched to provide channel features connecting diagonally opposed pairs of the through holes 152 at each end of the shim. As illustrated, cross hatching indicates areas to be etched. Shim pattern C (FIG. 12) includes an open space or through slot 154 connecting a diagonally opposed pair of end through holes 152.

Diagonally opposed holes are connected by the etched or slotted portion of each shim such that each shim can be used in providing either a reaction channel or a heat exchange fluid channel, by inversion of the shim. Each individual reaction channel or fluid channel is formed by an A-C-B series of shims where the outer etched shims (A and B) have their etched surfaces facing shim C, and all connected through holes are aligned. Each A-C-B series can be inverted to be a part of the reactant flow path or the heat exchange fluid flow path. Reactor 100 is formed by alternately forming reactant flow paths and heat exchange flow paths, both beginning and ending with a heat exchange flow path. The repeating stacking order of the shims is indicated in FIG. 10 where A' and B' indicate inversions of the shim. The assembly of stacked shims are then diffusion bonded and separated into the three individual reactor units.

Modifications to the stacking order are also contemplated. For example, one or more additional shim pattern C can be inserted into either the reactant flow stack, the heat exchange flow stack, or both to form repeating patterns of A-C-C-B series, A-C-C-C-B series, etc. The beginning or ending or both flow paths could be a reactant flow path. As used herein, each of the shim A, B, and C are thin recessed sheets. The recesses in shims A and B include portions that are only partially removed from the top surface whereas the recesses in shim C include portions that are completely removed. A stack of alternating recesses sheets according to the present invention could also include unrecessed sheets in the stack. For example, if desired, a flow channel can be formed by placing a flat shim surface above and below through slot 154 of shim.

It is to be understood that individual shims may be made from any material compatible with the operating conditions of the system. Typically, elevated temperature and/or pressure require the use of a metal, for example copper, stainless steel, or high nickel alloys such as inconel. For metals, a preferred shim cutting or recesses forming method is photochemical etching. This patterning process has the capability to produce shims having highly complex patterns with no surface burring. Other patterning processes such as laser machining, electrochemical machining, embossing, coining, or stamping can also be used for producing shims for specialized applications or in mass production. It is contemplated that stamping would be employed in mass production such that flow paths would be formed primarily via a combination of shims that are through cut (like shim C) or flat.

The endblocks or endcaps used to sandwich the stacked shims and provide fluid interconnects are machined on a per-piece basis which may be automated for producing a stacked device in large quantities. Patterned shims are cleaned, preferably vapor degreased, prior to assembly to remove residual photoresist from the patterning process and any other organic contaminants. Moreover, any one or more of the shims can themselves be formed as a series of stacked plates.

Bonding of stacked shim/endblock assemblies into a single solid piece made of metal may be a high temperature/ high pressure diffusion bonding process under a vacuum. Assemblies of stacked shims can be placed into a pre-oxidized high temperature alloy clamping device to provide alignment and side support. Bonding may then be accomplished in a vacuum hot press. An alloy endplate (such as a molybdenum alloy) and ram extension are used to transmit pressure from the hot press ram to the stacked sub-assembly. For stainless steel, bonding conditions may be 920 degrees Celsius and 4000 pounds per square inch for 4 hours.

Of course, one skilled in the art will recognize that diffusion bonding may be done under various conditions inasmuch as diffusion bonding is a time, pressure, and temperature variable process. For example, conditions might be temperatures up to 950 degrees Celsius (° C.) and pressures up to 3000 pounds per square inch (psi) for up to 8 hours.

An alternative diffusion bonding process avoids an external ram. The ramless process relies upon a positive difference between thermal expansion coefficients of the sub-assembly material compared to the clamping device material to produce the pressure required for bonding at elevated temperature. Ultrasonic bonding processes may also be used. Alternative forms of metal bonding, including diffusion brazing, soldering, hot isostatic pressing and combinations thereof could also be used.

Various coatings may also be applied to assist bonding of the shims. For example, electroless nickel plating can be performed in conjunction with the diffusion bonding for bonding stainless steel shims. In this procedure, the metal surfaces to be bonded are first exposed to a nucleation agent. One nucleation agent that can be used is a stannous chloride solution ($SnCl_2$). Next the surface is exposed to a solution of a reducing agent and a nickel salt to deposit a thin layer of metallic nickel onto the surface. Possible choices include a sodium hypo-phosphite ($H_2NaPO_2$) as reducing agent with $NiCl_2$ as the salt. The entire process occurs at a temperature of about 70 degrees C. In other embodiments other types of plating may be performed under various conditions and with other reagents. Alternatively or in addition, reactor 100 can be assembled according to the techniques described in U.S. Pat. No. 6,192,596 to Bennett et al. or U.S. Pat. No. 6,994,829 to Whyatt et al., which claims the benefit of U.S. Provisional App. Ser. No. 60/296,295, filed Jun. 6, 2001.

The set of three reactor units can be separated into individual units by wire EDM. Wire EDM is also used to form slits or elongated slots in the sides of the reactors down substantially the entire length of each reactor channel. These slits provide access to the space defined by shim C in each of the reactor channels and serve as catalyst loading ports. The edges of each of the shims along the reactor length have been provided with etched portions 160 that serve to help guide formation of these catalyst loading slits. In addition, each of the shims includes an identifying notch (not shown) at the end to further assist in locating the appropriate location for slit formation.

Catalyst is provided into each of the reaction channels as a sheet. The catalyst sheet rests on the ribs 164 in the etched channel portion of shims A and B to have reaction flow channels above and below the catalyst sheet (see the repeat unit in FIG. 3). These ribs 164 are formed as unetched portions along the majority of the length of the etched channels between end holes 152 in shims A and B. Once the catalyst sheets are inserted, a metal strip fills the slot and is welded in place. To minimize axial heat conduction (down the length of the reactor) excess metal is trimmed from the sides of the reactor.

The catalyst sheets are formed by depositing a powdered catalyst onto a support. The support can be a metal fabric material such as a sheet of fibrous felt. Suitable material is known as FECRALY available from Technetics Corp., DeLand, Fla. Suitable support thickness is 0.010 inches thick having a void fraction of 76%.

The catalyst can be any catalyst or combination of catalysts appropriate for the reaction of interest. For the WGS reaction, an appropriate catalyst powder is a cerium oxide supported precious metal catalyst obtained from "Süd Chemie, Louisville, Ky.", Model #FCS-PMS5-LTS. This catalyst is a high activity catalyst, though a low activity precious metal catalyst, a copper-based catalyst, or combinations thereof could also be used. Other suitable WGS catalysts include low activity precious metal catalysts, copper-based catalysts, or any of the catalysts described in U.S. Pat. No. 5,128,307 to Wanjek et. al, and U.S. Pat. No. 5,990,040 to Hu et al., of in the paper "Nanoscale Water-Gas-Shift Catalysts" S. L. Swartz, C. T. Holt, and W. J. Dawson, presented at 2000 Fuel Cells Seminar Oct. 30-Nov. 2, 2000 Portland, Oreg.; Book of Abstracts; pp. 9301. Combinations of catalysts, such as a combination of a high temperature and low temperature catalyst could also be used. High temperature catalysts would have a lower precious metal content.

Prior to depositing the catalyst on the support, the sheet is calcinated at 890° C. in air at atmospheric pressure for about four hours. The catalyst is loaded on the sheets by suspending the catalysts in a slurry and dipping the sheets with successive dryings until the desired catalyst loading is achieved. Alternatively, assisted deposition, such as electrophoretic deposition, could be employed.

The catalyst particles forming the powder are preferably of small substantially uniform size, for example, less than about 1 μm. Larger catalyst particles can be reduced in a microfluidizer obtained from "Microfluidics Corporation, Newton, Mass.", Model #11-110Y or by any other conventional technique such as ball milling. The catalyst powder is deposited in approximately 10-100 weight percent catalyst relative to the weight of the felt sheet. Alternatively or in addition, the catalyst is deposited on the surface of the sheet in a thickness approximately equal to the original thickness of the support sheet.

It is understood that the support sheet serves as a substantially inert structural support for the powdered catalyst and could be replaced with any suitable material such as, for example, a metal foam.

With the catalyst is provided as a porous sheet, the reactant flow is termed "flow-by" reaction. This is because the reactants flow by the catalyst sheet and molecularly diffuse into the sheet and the products of the reaction molecularly diffuse out of the sheet, where, in each case the diffusion is in a direction generally transverse to the bulk flow direction.

One alternative form of the invention includes a catalyst sheet in contact with the wall, for example by switching the reactant flow channel and the catalyst layers in the repeat pattern depicted in FIG. 3, or as depicted schematically in FIG. 9. In still further forms, two catalyst layers are in contact with two walls of the reaction channel with the reactant flow path between the catalyst layers. In these forms, the catalyst sheet can be provided against a wall of the reactant flow channel in accordance with U.S. Pat. No. 6,488,838 titled Chemical Reactor and Method for Gas Phase Reactant Catalytic Reactions, assigned to the same assignee as the present invention, and hereby incorporated by reference in its entirety.

In still further forms, the reaction channel is configured to direct flow through the catalyst sheet from a reactant flow path on one side of the catalyst sheet to a reactant flow path on the opposite side of the catalyst sheet.

In still further forms, catalyst is directly provided in the reaction channels in powdered or pellet form rather in place of or in addition to the catalyst provided on sheets separately inserted into the channels. In a still further forms, catalyst is coated on the walls of the reaction channel.

Optionally, catalyst can be provided in the heat exchange channels in reactor 100. It is to be understood that when catalyst is provided in both the reaction channels and the heat exchange channels, catalyst insertion slits for the two catalysts are formed in opposite long side of the reactor. (see detail A of FIG. 8 and detail C of FIG. 9) Catalyst is provided in both fluid channels to provide the ability to run, for example, an endothermic reaction in the cooling channels while running an exothermic reaction in the reaction channels. An example would be to run the Sabatier reaction (SR) on the hot side (the reaction channels) with the reverse-water-gas-shift reaction (RWGS) in the cooling channels.

Where no catalyst is needed in the heat exchange channels, for example if straight cooling fluid is used, the heat exchange fluid channels can be formed with a single shim or with a pair of shims A and B without shim C.

Figure 14:
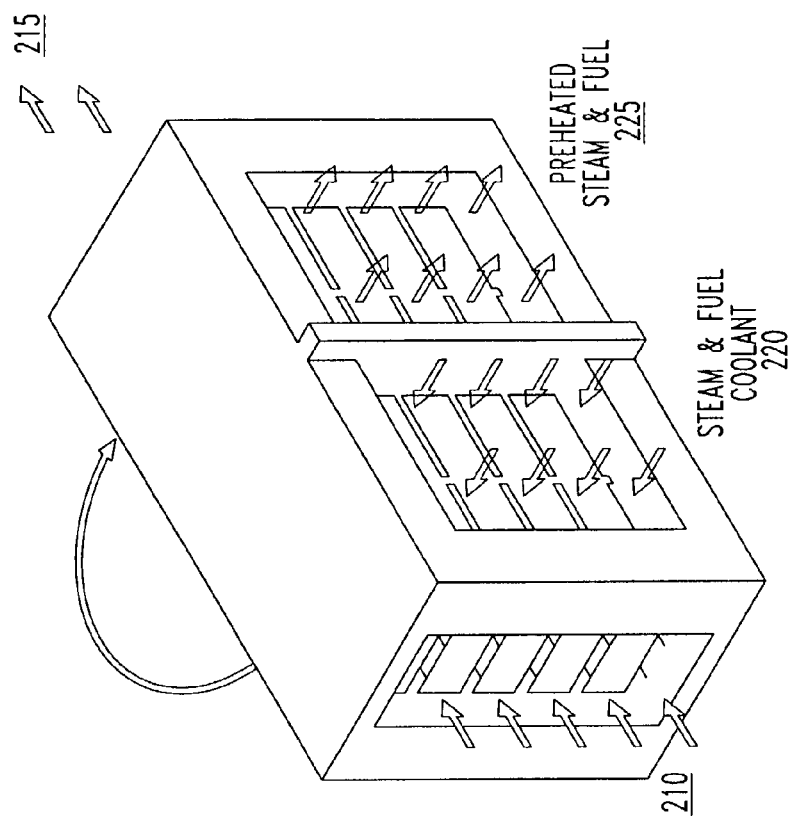
FIGS. 13 and 14 are another embodiment of a microchannel reactor having cross-current cooling fluid flow.
Figure 13:
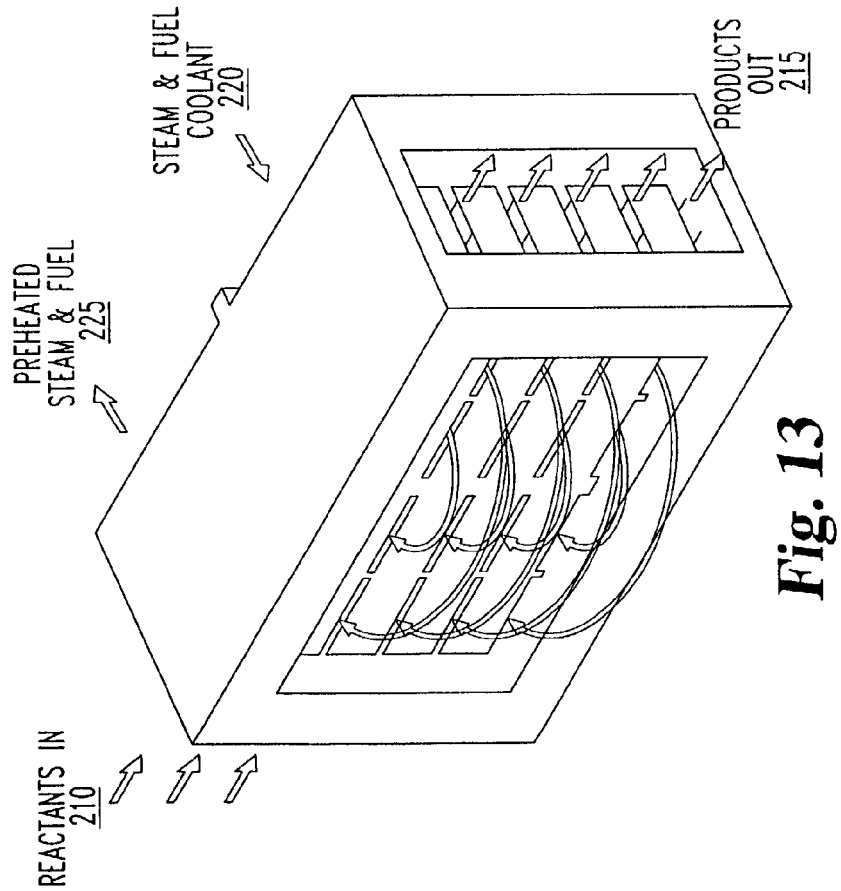
Figure 15:
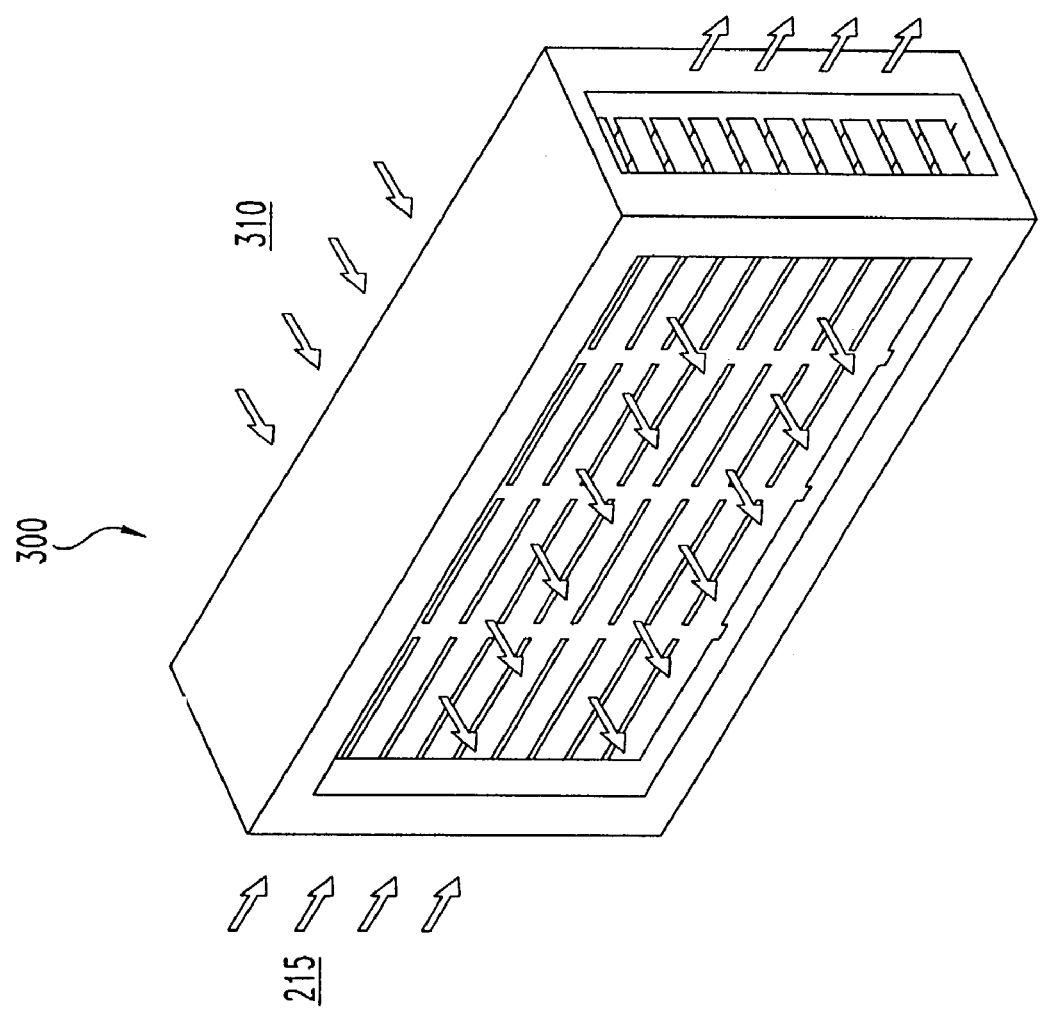
FIG. 15 is another embodiment of a microchannel reactor having cross current cooling fluid flow.

FIGS. 13 and 14 and FIG. 15 each depict additional microchannel reactors that can be used alone or in combination with each other or with other microchannel reactors. Each of reactors 200 and 300 are formed from a single block of stainless steel with the coolant and reactant flow channels formed by carving them from the block via wire EDM. Reactor 200 (FIGS. 13 and 14) is a high temperature reactor and receives water gas shift reactants 210 for flow down the length of the reactor 200 to be outlet as products 215. Steam and fuel serve as the coolant 220 in a dual pass cross-current flow, where it is understood that the heated products 225 could then be sent to a fuel reformer for further processing.

Reactor 300 (FIG. 15) serves as a low temperature reactor and receives the outlet 215 of reactor 200. Air serves as the coolant 310 in reactor 300.

While there is no intervening cooling of the outlet of reactor 200 prior to being fed as the inlet to reactor 300, reactors 200 and 300 are physically separate and thus are thermally isolated from each other. In addition, reactors 200 and 300 have independent cooling streams, which provided additional design freedom in using them together to approach the theoretically optimal temperate trajectory described above with respect to FIG. 2. For example the coolant approach temperature or flow rate in reactor 200 can be high to handle the increased thermal load required at the beginning of the reaction.

The use of a sequence of separate microchannel reactors, for example reactors 200 and 300, provides one mechanism to provide segmented temperature control. Other forms of segmented temperature control are also contemplated for microreactors according to the present invention operating in co-current flow, counter-current flow, cross current flow, or any combination thereof. One form of segmented temperature control is provided by aspects of the reactors that are non-uniform down the length of the reactor. Example of such aspects that can be non-uniform include, without limitation, the size and/or the geometry of the heating or cooling channels (for example the depth and/or the width of the channels could vary), catalyst loading, catalyst activity, catalyst type, and the existence, non-existence, or size of extended heat transfer surfaces.

A particular example of non-uniform flow geometries includes a triangular or fluted shaped reaction channel of increasing or decreasing size down the channel. Another example is to have a radial flow in the reaction channel where flow would be from the center of a disk outwardly, or vice versa. Another example is to have a combination of macrochannels and microchannels in either the heat exchange flow path or the reactant flow path.

Conduction can also serve as a primary means to control the reaction temperature by, for example, placing the cool end of a reactor in contact with a heat sink. Alternatively or in addition, the hot end of the reactor can be actively heated, for example with heaters inserted in or placed proximate the reactor. Suitable heaters that can be inserted in the reactor would be electric resistive heaters in the form of rods or the like, which could be inserted, for example adjacent the through holes 150, 152 at one end of the reactor.

It is also contemplated that uses of the present invention will include an adiabatic reaction segment prior to introduction of the reactants into a microchannel thermally controlled reaction segment.

It is also contemplated that one or more of the reactants or the heat exchange fluid or both can undergo a phase change, for example from a liquid to a gas.

In practicing the present invention, a wide variety of reversible and irreversible reactions may be employed as would occur to those of skill in the art. Non-limiting examples includes water gas shift (with or without prereforming or steam reforming on the cool side), Sabatier Process reaction (with or without reverse water gas shift on the cool side), Ammonia synthesis, Methanol synthesis, Esterfication, Olefin hydration, MTBE synthesis, preferential oxidation, selective methanation, and combinations thereof. With respect to irreversible reactions advantages of temperature control can include increased selectivity.

Other types of chemical processes can also benefit from performance in the inventive reactors and with the temperature of the present invention. For example, adsorption processes are sometime temperature dependent, and exhibit similar behavior of reversible exothermic reaction. In other words, adsorption rate increases with increasing temperature, leading to a faster adsorption processes at higher temperatures, but equilibrium adsorption decreases with increasing temperature. An example of this is when adsorption depends on diffusion into the bulk solid, because diffusion rate increases with temperature. Accordingly, substituting an adsorption medium in place of the reaction catalyst in the reaction microchamber of, for example FIG. 9, would allow a high temperature input of the adsorption stream that can be rapidly cooled to achieve a greater degree of adsorption than could be achieved at the initial inlet temperature. One particular application of this adsorption technique would be the adsorptive removal of sulfur (typically in the form of hydrogen sulfide) from a reformate stream utilizing Zinc oxide as the adsorption medium.

As will be recognized by those of skill in the art, one form of the invention is a method for performing a reversible exothermic reaction comprising flowing exothermic reactants through an exothermic reaction microchannel in thermal contact with a heat exchange channel, and conducting heat generated by the exothermic reaction into fluid flowing through the heat exchange channel to substantially lower the temperature of the exothermic reactants as they travel through the exothermic reaction channel. In one refinement, the heat exchange channel is also a microchannel. In still other refinements the length scale for heat exchange length scale is less than about 1.0 cm, preferable less than about 0.5 mm, and more preferably less than about 0.2 mm. In still other refinements, exothermic reactants in the reaction microchannel flow by a substantially continuous catalyst surface for a substantial portion of the length of the reaction microchannel. In still further refinements the exothermic reaction microchannel has a depth parallel to the heat transfer direction less than about 0.2 mm. In still further refinements, the approach temperature of the heat exchange fluid is less than about 50° C. In still further refinements, an endothermic reaction is performed within the heat exchange channel.

Another form of the invention is a method for performing a reversible exothermic reaction comprising flowing exothermic reactants through an exothermic reaction microchannel in thermal contact with a heat exchange channel, and conducting heat generated by the exothermic reaction into fluid flowing through the heat exchange channel wherein the heat exchange fluid outlet temperature is within about 25° C. of the reactant inlet temperature. In further refinements, the temperatures are about equal and in still further forms the heat exchange fluid outlet is hotter than the reactant fluid inlet.

Another form of the invention is a unique method for performing an endothermic reaction comprising flowing endothermic reactants through an endothermic reaction microchannel in thermal contact with a heat exchange channel, and conducting heat from the heat exchange channel to the reaction channel to provide heat to sustain the endothermic reaction. In one form heat is provided in sufficient quantity to substantially raise the temperature of the reactants as they travel through the reaction channel.

Another form of the invention is a method for performing a reversible chemical reaction comprising flowing reactants through a reaction microchannel in thermal contact with a heat exchange channel, reacting the products in the reaction microchannel, and conducting heat between the reaction microchannel and fluid flowing through the heat exchange channel during the reaction, wherein at least one of the reaction microchannel and the heat exchange channel are of substantially non-uniform cross sectional area during their lengths in thermal contact.

Another form of the invention is a method for performing a reversible chemical reaction comprising flowing reactants through a reaction microchannel in thermal contact with a heat exchange channel, reacting the products in the reaction microchannel, and conducting heat between the reaction microchannel and fluid flowing through the heat exchange channel during the reaction, wherein reactants contact reaction catalyst of substantially non-uniform catalyst activity along the length of the reaction microchannel.

Another form of the invention is a differential temperature reactor comprising an exothermic reaction channel having a channel inlet and a channel outlet and at least one exothermal reactant microchannel flow path from the channel inlet to the channel outlet; an exothermic reaction catalyst in the exothermic reaction channel; and at least one heat exchange channel in thermal contact with the exothermic reaction channel, the heat exchange channel defining a heat exchange fluid microchannel flow path; wherein the at least one heat exchanger channel is operable to remove a sufficient quantity of heat from the exothermal reaction channel to cause the average temperature across a cross section of the exothermal reactant flow path in the exothermic reaction channel to substantially continuously decrease from a maximum average temperature in the reactant flow path to a minimum average temperature in the flow path near the channel outlet; wherein the maximum and minimum temperatures are substantially different. In one refinement the maximum and minimum temperatures differ by at least about 25 degrees Celsius.

Another form of the invention is a differential temperature reactor comprising an endothermic reaction channel having a channel inlet and a channel outlet and at least one endothermic reactant microchannel flow path from the channel inlet to the channel outlet; an endothermic reaction catalyst in the endothermic reaction channel; and at least one heat exchange channel in thermal contact with the endothermic reaction channel, the heat exchange channel defining a heat exchange fluid microchannel flow path; wherein the at least one heat exchanger channel is operable to provide a sufficient quantity of heat to the endothermic reaction channel to cause the average temperature across a cross section of the endothermic reactant flow path in the endothermic reaction channel to substantially continuously increase to a maximum average temperature in the reactant flow path from a substantially different minimum average temperature in the flow path near the channel inlet; wherein the maximum and minimum temperatures are substantially different.

In another form the invention is a microchannel reactor comprising a reaction microchannel in thermal contact with a heat exchange microchannel wherein the heat transfer power density between the reaction microchannel and the heat exchange microchannel is at least about 1.0 watt/cm$^3$.

In another form, the invention is a novel differential temperature reactor comprising an array of reaction microchannels wherein at least one surface defining the reaction microchannels includes an reaction catalyst; and an array of heat exchange flow channels in thermal contact with the exothermic reaction microchannels for conveying a heat exchange fluid wherein, during operation, heat is conducted between the reaction microchannels and the heat exchange fluid to control the temperature trajectory in the reaction channel.

In another form the invention is a microchannel reactor including a reaction microchannel in fluid contact with a catalytic monolith and at least one heat exchange flow path in thermal contact with the exothermic reaction microchannel via at least one wall. In one form the catalytic monolith is in contact with the at least one wall. In another form the reaction microchannel is between the catalytic monolith and the at least one wall and/or the catalytic monolith is not in contact with the at least one wall.

In another form the invention is a microchannel reactor including an exothermic reaction microchannel in thermal contact with an endothermic reaction microchannel.

EXAMPLES

Example 1

Figure 8:
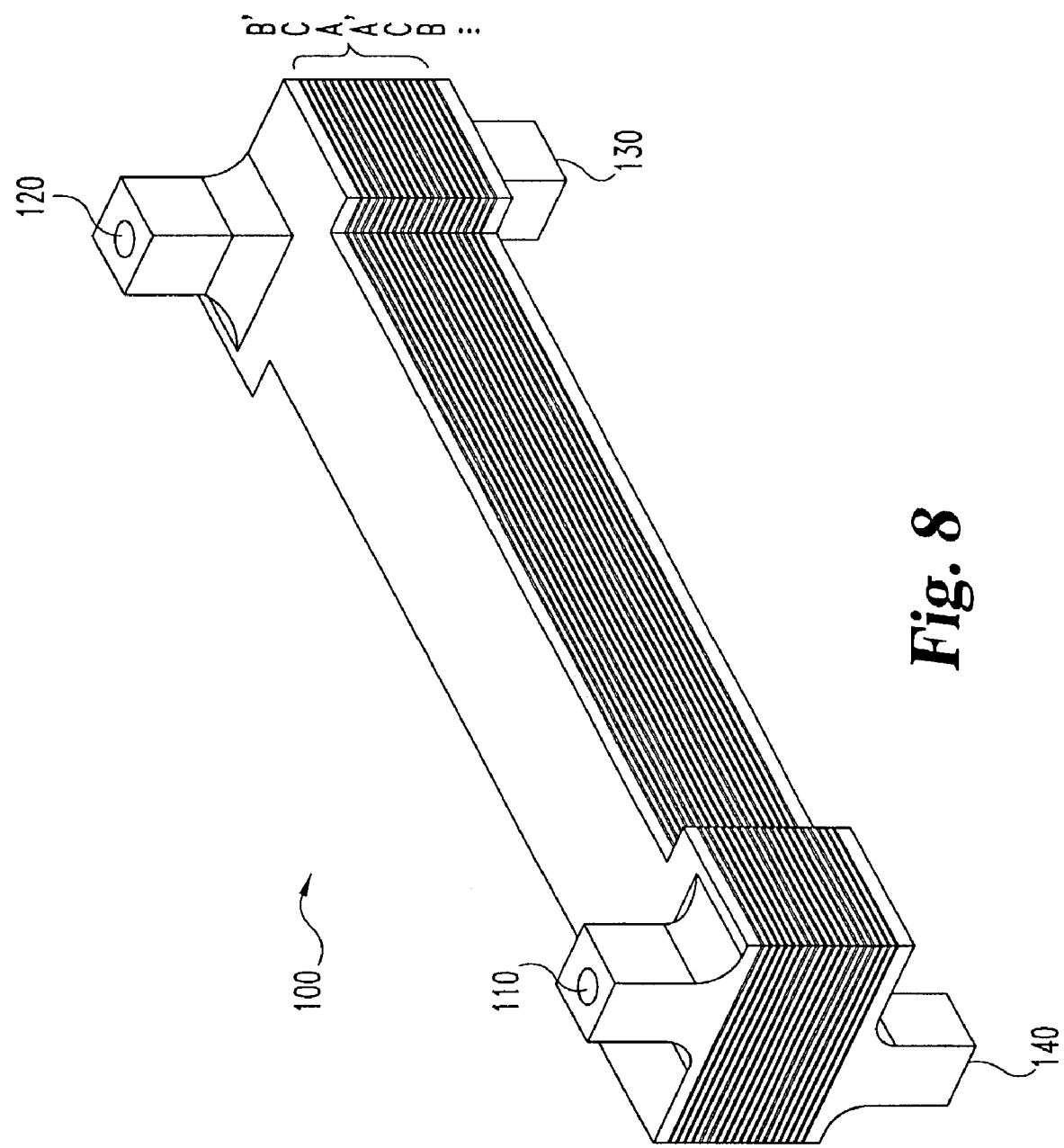
FIG. 8 is a perspective views of a microchannel reactor according to an embodiment of the invention.

A microreactor having seven pairs of interleaved reaction microchannels and heat exchange microchannels was constructed as depicted in FIG. 8 and a water gas shift was performed under different cooling conditions. The reactant feed stream was a dry gas mixture containing 73% H2, 1% N2, 4.6% CO, and 21% CO2 combined with water vapor mixture in a ratio of 0.5 moles of water per mole of dry gas, and the coolant was air. The reactants and the coolant were fed into opposite ends of the device such that the device was operated in counter-current flow. The coolant temperature and flow rate were varied to operate the reactor under a variety of conditions. For some runs, the reactor was operated isothermally by flowing coolant air at a sufficiently high flow rate to maintain a relatively constant air temperature. In other runs, the reactor was operated in a differential temperature mode by flowing the coolant air at a sufficiently low flow rate to allow the coolant air temperature to increase causing the temperature of the reactant mixture to decrease from the inlet to the outlet. The reaction gas flow rate and composition were maintained constant among all runs. Four equally spaced thermocouples were inserted into the reactor wall to measure the reactor temperature profile.

In a first isothermal run, the coolant air at the inlet and outlet were measured to be 273° C. and 276° C. respectively. The four thermocouples measured temperatures of 277° C., 269° C., 274° C., and 274° C. along the reactor. The measured CO concentration of the effluent mixture was 2.26 mol % on a dry basis, representing 49% conversion of the CO.

In a second isothermal run, the coolant air at the inlet and outlet were measured to be 299° C. and 300° C. respectively. The four thermocouples measured temperatures of 301° C., 294° C., 300° C., and 300° C. along the reactor. The measured CO concentration of the effluent mixture was 1.77 mol % on a dry basis, representing 59% conversion of the CO.

In a third isothermal run, the coolant air at the inlet and outlet were measured to be 322° C. and 328° C. respectively. The four thermocouples measured temperatures of 329° C., 320° C., 324° C., and 325° C. along the reactor. The measured CO concentration of the effluent mixture was 1.70 mol % on a dry basis, representing 61% conversion of the CO.

In a fourth isothermal run, the coolant air at the inlet and outlet were measured to be 352° C. and 356° C. respectively. The four thermocouples measured temperatures of 355° C., 347° C., 353° C., and 353° C. along the reactor. The measured CO concentration of the effluent mixture was 2.18 mol % on a dry basis, representing 50% conversion of the CO.

In a differential temperature run, the coolant air was measured to be 271° C. at the inlet and 352° C. at the outlet, a coolant temperature increase of 81° C. The four thermocouples measured temperatures of 355° C., 318° C., 294° C., and 280° C. along the reactor, a decrease of 75° C. The measured CO concentration of the effluent mixture was 1.57 mol % on a dry basis, representing 64% conversion of the CO.

The differential temperature run showed better conversion than any of the isothermal runs. In addition, data from the isothermal runs were interpolated to find a minimum CO concentration with a quadratic least squares fit of the CO effluent concentration with temperature. This interpolation indicates that a minimum CO concentration in isothermal mode would be 1.65% CO at 317° C. Thus, the differential temperature mode performed better than the best projected isothermal mode. Both isothermal and differential temperature are projected to be better than adiabatic operation.

Example 2

A water-gas-shift reactor having the geometry depicted in FIG. 3 was modeled using the Femlab® software package, a PDE-based multiphysics modeling tool. Using a two-dimensional model, the convective, diffusion differential equations were solved in the catalyst and reaction flow domains, while the convective, conduction equation were solved in all four domains. A kinetic expression for the water-gas-shift reaction was used that was empirically determined from experimental data for a cerium oxide supported precious metal catalyst obtained from "Süd Chemie, Louisville, Ky.", Model #FCS-PMS5-LTS. The flow fields in the reaction flow channel and the heat exchange channel were specified as parabolic with specified inlet temperatures. The convective, diffusion equation was solved in terms of conversion, with zero conversion specified as a boundary on the inlet of the reactant flow channel. The two symmetry planes and all other external boundaries were specified with no flux conditions for both heat and mass transfer.

Figure 4:
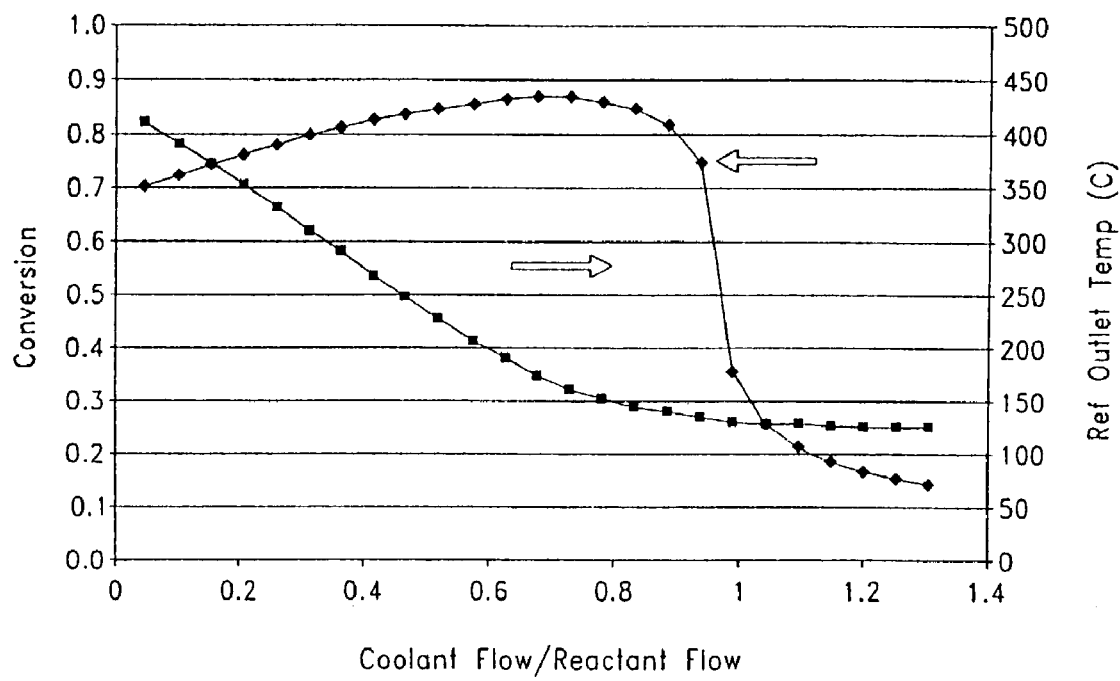
FIG. 4 is a plot of the representative effect of coolant flow rate on CO conversion and reformate outlet temperature for a water-gas-shift microchannel reactor according to FIG. 3 having a constant steam reformate feed at 350° C. and an initial composition of 9% CO, 9% $CO_2$, 36% $H_2O$, and 45% $H_2$ and being cooled with air that is 125° C. at the coolant inlet.
Figure 5:
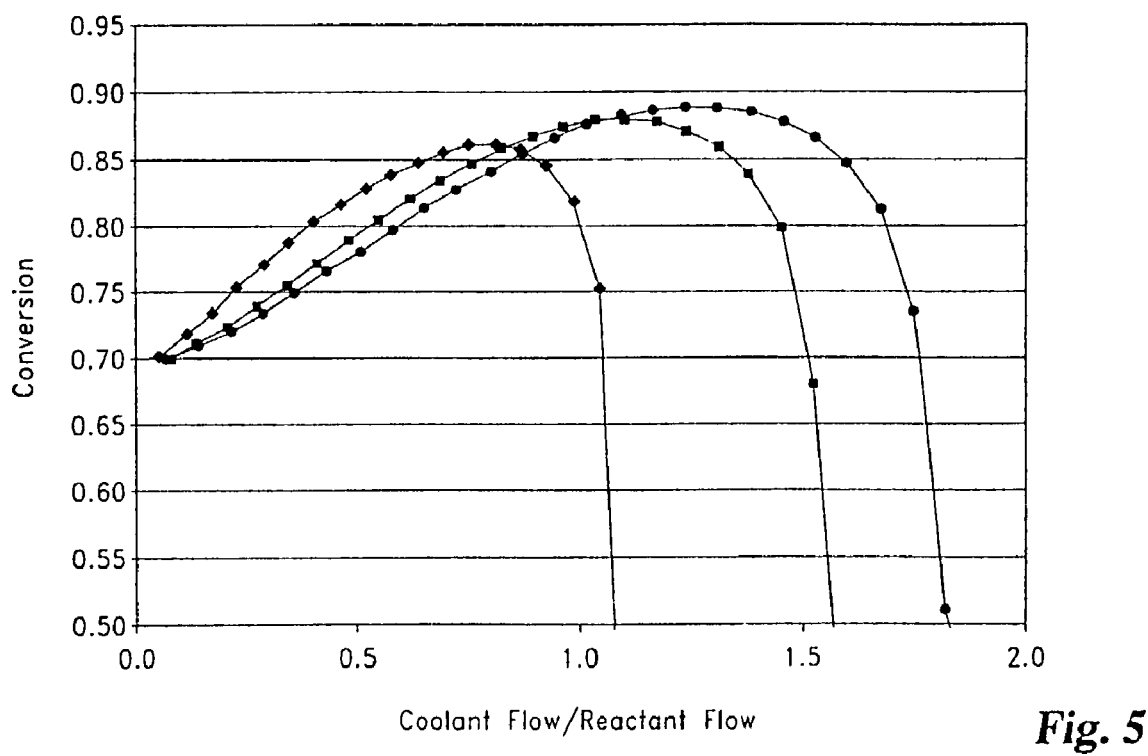
FIG. 5 is a plot of the representative effect of coolant temperature on CO conversion for a water-gas-shift microchannel reactor according to FIG. 3 having a constant steam reformate feed at 350° C. and an initial composition of 9% CO, 9% $CO_2$, 36% $H_2O$, and 45% $H_2$; results shown for coolant inlet temperature of 125° C. (♦), 200° C. (■), and 225° C. (●).

FIG. 4 provides calculated results demonstrating the potential for increasing conversion of a reversible, exothermic reaction with active cooling in microchannels. In this example, the steam reformate feed to a microchannel WGS reactor is kept at constant flow rate and inlet temperature of 350° C., while increasing the flow rate of 125° C. air as coolant. At very low coolant flow, the reactor is essentially adiabatic, and the reaction mixture increases to over 400° C., where the conversion is limited to 70%. As the coolant flow rate is increased, the reformate outlet temperature decreases allowing the CO conversion to increase to maximum of 87%. However, if the coolant flow is increased further, the reaction mixture is cooled too quickly before substantial conversion can occur, effectively quenching the reaction.

Based on these calculations presented in FIG. 4, a preferred mode of operating the WGS reaction is with a CO outlet concentration of 1.2 mol %, a CO reaction rate density of 105 mmol CO/(hr.cm$^3$), a heat exchange power density of 3.3 W/cm$^3$ based on the core of the reactor, a hot end approach temperature of −48° C., (the negative refers to the fact that the coolant outlet is hotter than the reactant inlet due to heat generation), and a cold end approach temperature of 49° C.

Example 3

Simulations were performed according to Example 2 above for a variety of coolant inlet temperatures. Exemplary results are present in FIG. 5. For 225° C. air as the coolant inlet (designated by the circles of FIG. 5) a preferred mode of operation under similar assumptions can be with a CO outlet of 0.95 mol %, a heat exchange core power density of 2.6 W/cm$^3$, a hot end approach temperature of −33° C. (i.e. the coolant outlet is hotter than the reactant inlet due to heat generation), and a cold end approach temperature of 10° C.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. All publications, patents, and patent applications cited in this specification are herein incorporated by reference as if each individual publication, patent, or patent application were specifically and individually indicated to be incorporated by reference and set forth in its entirety herein.

What is claimed is:

1. A method of operating a microreactor comprising:
   providing a fluid processing device comprising a stack of sheets integrally bonded, the stack including alternating recessed sheets which define at least a portion of first and second flow paths;
   wherein the first flow path includes a reaction microchamber including catalyst material and having an inlet and an outlet thereto within the stack, wherein the catalyst material is a exothermic reaction catalyst, and
   wherein the second flow path is in thermal contact with the reaction microchamber;
   passing a first fluid through the reaction microchamber wherein the first fluid interacts with the catalyst material to undergo a reversible, exothermic chemical process in the reaction microchamber; and transferring a sufficient quantity of heat from the exothermic chemical process to a fluid flowing through the second flow path to cause the temperature of the first fluid to be lower at the outlet than at the inlet thereby increasing at least one performance parameter of the exothermic chemical process relative to performance of the exothermic chemical process if the temperature of the reactants had been constant, wherein the temperature of the first fluid is at least about 25° C. lower at the outlet than at the inlet.

2. The method of claim 1 wherein the reaction microchamber and the second flow path are disposed in planes substantially parallel to each other.

3. The method of claim 1 wherein the temperature of the first fluid is at least about 50° C. lower at the outlet than at the inlet.

4. The method of claim 1 wherein the exothermic chemical process includes at least one reaction selected from the group consisting of the water gas shift, Sabatier Process, Ammonia synthesis, methanol synthesis, esterfication, olefin hydration, MTBE synthesis, preferential oxidation, and selective methanation.

5. The method of claim 4 wherein the exothermic chemical process is the water gas shift reaction.

6. The method of claim 1 wherein the exothermic chemical process includes competing reactions and the increased performance parameter is selectivity.

7. A method of operating a microreactor comprising:
providing a fluid processing device comprising a stack of sheets integrally bonded, the stack including alternating recessed sheets which define at least a portion of first and second flow paths;
wherein the first flow path includes a reaction microchamber including catalyst material and having an inlet and an outlet thereto within the stack, and
wherein the second flow path is in thermal contact with the reaction microchamber;
passing a first fluid through the reaction microchamber wherein the first fluid interacts with the catalyst material to undergo an exothermic chemical process in the reaction microchamber; and
transferring a sufficient quantity of heat from the exothermic chemical process to a fluid flowing through the second flow path to cause the temperature of the first fluid to be lower at the outlet than at the inlet thereby increasing at least one performance parameter of the exothermic chemical process relative to performance of the exothermic chemical process if the temperature of the reactants had been constant;
wherein the exothermic chemical process is an adsorption process and the catalyst material is the adsorption medium.

8. The method of claim 7 wherein the exothermic chemical process is sulfur adsorption.

9. A method for performing an equilibrium limited exothermic chemical process comprising:
performing an equilibrium limited exothermic chemical process by flowing reactants through a reaction microchamber in thermal contact with at least one heat exchange channel, and
conducting heat generated by the equilibrium limited exothermic chemical process into fluid flowing through the at least one heat exchange channel in sufficient quantity to lower the temperature of the reactants as they progress through the reaction microchamber by at least about 25° C. and to substantially increase at least one performance value of the exothermic chemical process relative to its equilibrium value under isothermal conditions at the highest temperature of the reactants in the reaction microchamber.

10. The method of claim 9 wherein the reaction microchamber includes substantially planar porous catalyst material and reactants flow by the catalyst material in a direction substantially parallel to a porous surface of the catalyst material.

11. The method of claim 10 wherein reaction with the catalyst occurs via diffusion of the reactants into the porous catalyst in a direction substantially transverse to the bulk flow of the reactants past the catalyst material.

12. The method of claim 9 wherein the heat exchange channel is a microchannel.

13. The method of claim 9 wherein heat generated by the exothermic reaction is conducted into a plurality of heat exchange microchannels.

14. The method of claim 13 wherein flow through the plurality of heat exchange microchannels is generally transverse to flow through the reaction microchamber.

15. The method of claim 13 wherein flow through the plurality of heat exchange microchannels is generally parallel to flow through the reaction microchamber.

16. The method of claim 9 wherein the at least one heat exchange channel includes an endothermic reaction chamber in thermal contact with the reaction microchamber and an endothermic reaction occurs in the endothermic reaction chamber.

17. The method of claim 16 wherein the endothermic reaction is reverse water gas shift and the exothermic reaction is Sabatier process.

18. The method of claim 16 wherein the endothermic reaction is steam reforming and the exothermic reaction is water gas shift.

19. The method of claim 9 wherein a heat transfer length for the heat transfer between the reaction microchamber and the at least one microchannel is less than about 0.5 cm.

20. The method of claim 9 wherein the reaction microchamber defines a first centerline and the at least one heat exchange channel defines a second centerline in a plane generally parallel to the first centerline and spaced therefrom by less than about 1.0 cm.

21. The method of claim 9 wherein the reaction microchamber is constructed such that fluid therein flows by a substantially continuous catalyst surface for a substantial portion of the length of the reaction microchamber.

22. The method of claim 9 wherein the reaction microchamber has a dimension parallel to the heat transfer direction that is less than about 0.2 mm.

23. The method of claim 9 the approach temperature of the heat exchange fluid is less than about 50° C.

24. The method of claim 9 wherein the smallest dimension of at least one of the reaction microchamber and the at least one heat exchange channel is less than about 0.5 mm and the heat conduction occurs in a direction substantially parallel to the smallest dimension of at least one of the reaction microchamber and the at least one heat exchange channel.

25. A method for performing a reversible exothermic reaction comprising:
flowing reactants for a reversible exothermic reaction through a reaction microchamber having an inlet end and an outlet end, wherein the reaction microchamber is in thermal contact with an inlet portion and an outlet portion of a heat exchange channel,
conducting a reversible exothermic reaction in the reaction chamber, and transferring heat generated by the reversible exothermic reaction into fluid flowing through the heat exchange channel in sufficient quantity such that the approach temperature is less than about 25° C. and the outlet end of the reaction microchamber is at least about 25° C. lower than the inlet end of the reaction microchamber.

26. The method of claim 25 wherein the temperature of heat exchange fluid in the outlet portion of the heat exchange channel is at least about equal to the temperature of the reactants at the inlet end of the reaction microchamber.

27. The method of claim 25 wherein the temperature of the heat exchange fluid outlet is hotter than the reactant fluid inlet.

28. The method of claim 25 wherein the reaction microchamber is in thermal contact with at least one heat exchange channel through an intermediate wall portion and the volume of the reaction microchamber, the adjacent portion of the at least one heat exchange channel, and the intermediate wall portion define a heat exchange core volume; and
wherein the average heat transfer density between the microchamber and the heat exchange channel is greater than 0.1 W/cm$^3$ of heat exchange core volume.

29. The method of claim 28 wherein the average heat transfer density between the microchamber and the heat exchange channel is greater than 0.5 W/cm$^3$ of heat exchange core volume.

30. The method of claim 29 wherein the average heat transfer density between the microchamber and the heat exchange channel is greater than 1.5 W/cm$^3$ of heat exchange core volume.

31. A method for performing a water gas shift reaction on the product of a fuel reforming process comprising:
providing a reaction mixture containing CO, $CO_2$, $H_2O$ and $H_2$ into a reaction microchamber wherein the reaction microchamber is in thermal contact with at least one heat exchange channel through an intermediate wall portion and the volume of the reaction microchamber, the adjacent portion of the at least one heat exchange channel, and the intermediate wall portion define a heat exchange core volume; and
catalytically converting CO to $CO_2$ in the reaction microchamber at a rate of at least about 50 mmol per hour per cm$^3$ of heat exchange core volume and transferring heat out of the reaction microchamber such that the fluid exiting the reaction microchamber contains less than 2% CO by mole and is at least 25° C. colder than the fluid entering the reaction microchamber.

32. The method of claim 31 wherein the reaction microchamber includes substantially planar porous catalyst material and reactants flow by the catalyst material in a direction substantially parallel to a porous surface of the catalyst material.

33. The method of claim 32 wherein the substantially planar catalyst material includes catalyst supported on a porous substrate and the loading of catalyst on the substrate is substantially non-uniform in a direction parallel to the bulk flow direction of the reactants in the reaction microchamber such that the reactants encounter different effective densities of the catalyst as they flow by the catalyst material to control the extent and location of reaction through the reaction microchamber.

34. The method of claim 31 wherein an endothermic reaction occurs in the heat exchange channel adjacent the reaction microchamber.

35. The method of claim 31 wherein at least one of the reaction microchamber and the heat exchange channel have a non-uniform cross sectional area down their respective lengths during the time they are in thermal contact.

36. The method of claim 35 wherein the reaction microchamber has a portion with a substantially increasing cross sectional area.

37. The method of claim 35 wherein the reaction microchamber has a portion with a substantially decreasing cross sectional area.

38. A method for performing an endothermic and a reversible exothermic reaction comprising:
flowing endothermic reactants through an endothermic reaction microchamber in thermal contact with an exothermic reaction microchamber to transfer heat from the exothermic reaction to the endothermic reaction to sustain the endothermic reaction, wherein heat is transferred in sufficient quantity to raise the temperature of the endothermic reactants as they travel through the endothermic reaction microchamber,
wherein at least one of the reaction microchambers has a substantially non-uniform cross section down its length.

39. The method of claim 38 wherein the temperature of the exothermic reactants substantially decreases as the exothermic reactants travel through the exothermic reaction microchamber.

40. The method of claim 38 wherein the exothermic reaction is the Sabatier process and the endothermic reaction is the reverse water gas shift.

41. The method of claim 38 wherein substantially planar catalyst material is provided in the endothermic and the exothermic reaction microchambers.

42. The method of claim 41 wherein the catalyst material in at least one of the reaction microchambers has a substantially non-uniform catalyst loading in a direction parallel to the bulk flow direction of the reactants in the microchamber.

43. A method comprising:
providing a fluid processing device comprising a stack of sheets integrally bonded, the stack including alternating recessed sheets which define at least a portion of first and second flow paths;
wherein the first flow path includes a reaction microchamber having an inlet and an outlet thereto within the stack, and the reaction microchamber includes at least one planar porous sheet having reaction catalysts therein,
wherein the second flow path is in thermal contact with the reaction microchamber;
passing a first fluid through the reaction microchamber and by the porous sheet to perform a catalytically assisted exothermic reaction in the reaction microchamber by diffusing reactants transversely into the sheet; transferring a sufficient quantity of heat from the exothermic reaction to a fluid flowing through the second flow path to cause the temperature of the first fluid to be at least 25° C. lower at the outlet than at the inlet.

44. The method of claim 43 wherein the planar porous sheet is in contact with a wall of the reaction microchamber adjacent the heat transfer channel.

45. The method of claim 43 wherein the planar porous sheet is spaced from a wall of the reaction microchamber adjacent the heat transfer channel.

46. The method of claim 43 wherein the inlet is in fluid communication with at least one channel on one side of the porous sheet and the outlet is in fluid communication with at least one channel on an opposing side of the porous sheet such that reactants are provided on one side of the sheet and products removed from the opposing side of the sheet and substantial material transport occurs through the sheet.

47. A method for performing an equilibrium limited exothermic chemical process comprising:

flowing reactants for an equilibrium limited exothermic chemical process through a reaction microchamber in thermal contact with a heat exchange channel wherein at least one of the reaction microchamber and the heat exchange channel are of substantially non-uniform cross sectional area during their lengths in thermal contact;

reacting the reactants in the reaction microchamber; and conducting heat between the reaction microchamber and fluid flowing through the heat exchange channel during the reaction in sufficient quantity to cause the temperature of material exiting the reaction microchamber to be lower than material entering the reaction microchamber.

48. A method for performing a reversible chemical reaction comprising flowing reactants through a reaction microchannel in thermal contact with a heat exchange channel, reversibly reacting the reactants in the reaction microchannel, and conducting heat between the reaction microchannel and fluid flowing through the heat exchange channel during the reaction, wherein the reactants contact reaction catalyst having substantially non-uniform catalyst activity along the length of the reaction microchannel.

* * * * *